US011890713B2

(12) United States Patent

Imuta et al.

(10) Patent No.: US 11,890,713 B2

(45) Date of Patent: Feb. 6, 2024

(54) POWER TOOL AND COVER

(71) Applicant: MAKITA CORPORATION, Anjo (JP)

(72) Inventors: Ryo Imuta, Anjo (JP); Ryosuke Otani, Anjo (JP)

(73) Assignee: MAKITA CORPORATION, Anjo (JP)

( * ) Notice: Subject to any disclaimer, the term of this patent is extended or adjusted under 35 U.S.C. 154(b) by 639 days.

(21) Appl. No.: 17/044,361

(22) PCT Filed: Dec. 26, 2018

(86) PCT No.: PCT/JP2018/047914

§ 371 (c)(1), (2) Date: Oct. 1, 2020

(87) PCT Pub. No.: WO2019/198278

PCT Pub. Date: Oct. 17, 2019

(65) Prior Publication Data

US 2021/0094138 A1 Apr. 1, 2021

(30) Foreign Application Priority Data

Apr. 10, 2018 (JP) ................................ 2018-075714

(51) Int. Cl.

*B24B 23/00* (2006.01)
*B24B 55/05* (2006.01)
*B25F 5/02* (2006.01)

(52) U.S. Cl.

CPC ............ *B24B 23/005* (2013.01); *B24B 55/05* (2013.01); *B25F 5/02* (2013.01)

(58) Field of Classification Search

CPC .......... B25F 5/02; B24B 55/05; B24B 23/005

See application file for complete search history.

(56) References Cited

U.S. PATENT DOCUMENTS 2,274,421 A * 2/1942 Lindstrom ............... A01G 3/08 30/286
2,384,243 A * 9/1945 Flohr ...................... B24B 55/05 29/DIG. 60

(Continued)

FOREIGN PATENT DOCUMENTS

EP 3210726 A1 8/2017
JP S61-009247 U 1/1986

(Continued)

OTHER PUBLICATIONS

Jan. 5, 2022 Office Action issued in Chinese Patent Application No. 201880092234.X.

(Continued)

*Primary Examiner* — Anna K Kinsaul
*Assistant Examiner* — Lucas E. A. Palmer
(74) *Attorney, Agent, or Firm* — Oliff PLC

(57) ABSTRACT

A power tool may include: a motor; a power transmission mechanism connected to the motor; a housing that houses the motor and the power transmission mechanism; a tip tool holder connected to the power transmission mechanism and holding a tip tool; and a cover covering at least a part of the tip tool. The cover may include: a fixed cover portion fixed to the housing; a movable cover portion movable with respect to the fixed cover portion; and an operation member mechanically connected to the movable cover portion and configured to move the movable cover portion with respect to the fixed cover portion.

16 Claims, 27 Drawing Sheets

(56) References Cited

U.S. PATENT DOCUMENTS

| | | | | | |
|---|---|---|---|---|---|
| 2,589,309 | A * | 3/1952 | Tompkins | B27G 19/02 | 83/478 |
| 3,585,980 | A * | 6/1971 | Mellor | B24B 55/102 | 451/41 |
| 4,622,782 | A * | 11/1986 | Roestenberg | B24B 55/102 | 451/359 |
| 4,711,055 | A * | 12/1987 | Mickos | B27G 19/02 | 83/478 |
| 5,125,190 | A | 6/1992 | Buser et al. | | |
| 5,974,674 | A * | 11/1999 | Kelly | B27F 5/023 | 144/136.95 |
| 6,301,789 | B1 * | 10/2001 | Zeiler | B27B 9/00 | 30/388 |
| 6,471,574 | B1 * | 10/2002 | Rupprecht | B24B 23/02 | 83/440 |
| 6,491,575 | B2 * | 12/2002 | Sarantitis | B24B 7/186 | 451/356 |
| 6,699,114 | B1 * | 3/2004 | Booeshaghi | B24B 23/02 | 451/454 |
| 7,047,650 | B2 * | 5/2006 | Chen | B27F 5/023 | 30/373 |
| 8,523,637 | B2 * | 9/2013 | Loveless | B24B 23/028 | 451/356 |
| 11,014,214 | B2 * | 5/2021 | Shibata | B24B 23/02 | |
| 11,123,839 | B2 * | 9/2021 | Loveless | B24B 55/102 | |
| 2002/0133955 | A1 * | 9/2002 | Kani | B27G 19/04 | 30/390 |
| 2008/0022537 | A1 * | 1/2008 | Clarke | B23D 45/16 | 30/388 |
| 2008/0168667 | A1 * | 7/2008 | Spinato | B23D 45/16 | 30/276 |
| 2011/0275293 | A1 * | 11/2011 | Eto | B24B 55/10 | 451/453 |
| 2013/0047443 | A1 | 2/2013 | Brown et al. | | |
| 2014/0342645 | A1 | 11/2014 | Tagscherer | | |
| 2016/0039068 | A1 * | 2/2016 | Morris | B24B 23/02 | 29/434 |
| 2018/0290285 | A1 | 10/2018 | Sun | | |
| 2019/0202046 | A1 * | 7/2019 | Shibata | B24B 23/028 | |

FOREIGN PATENT DOCUMENTS

| | | | |
|---|---|---|---|
| WO | 2015/041105 | A1 | 3/2015 |
| WO | 2018/043330 | A1 | 3/2018 |

OTHER PUBLICATIONS

Mar. 12, 2019 Written Opinion issued in International Patent Application No. PCT/JP2018/047914.
Mar. 12, 2019 International Search Report issued in International Patent Application No. PCT/JP2018/047914.
Jul. 20, 2021 Office Action issued in Japanese Patent Application No. 2018-075714.

* cited by examiner

POWER TOOL AND COVER

TECHNICAL FIELD

The technique disclosed herein relates to a power tool and a cover.

BACKGROUND ART

Japanese Utility Model Application Publication No. S61 (1986)-9247 describes a power tool including: a motor; a power transmission mechanism connected to the motor; a housing that houses the motor and the power transmission mechanism; a tip tool holder connected to the power transmission mechanism and holding a tip tool; and a cover covering at least a part of the tip tool. The cover includes: a fixed cover portion fixed to the housing; and a movable cover portion movable with respect to the fixed cover portion.

SUMMARY OF INVENTION

Technical Problem

In the power tool as described above, when a user moves the movable cover portion with respect to the fixed cover portion, the user needs to grasp and move the movable cover portion. This requires the user to bring his/her hand closer to the tip tool which is being driven near the movable cover portion when the user tries to move the movable cover portion while the tip tool is being driven. The present disclosure provides a technique capable of improving user safety in a power tool that includes a cover including a fixed cover portion and a movable cover portion movable with respect to the fixed cover portion.

Solution to Technical Problem

The present disclosure discloses a power tool. The power tool may include: a motor; a power transmission mechanism connected to the motor; a housing that houses the motor and the power transmission mechanism; a tip tool holder connected to the power transmission mechanism and holding a tip tool; and a cover covering at least a part of the tip tool. The cover may include: a fixed cover portion fixed to the housing; a movable cover portion movable with respect to the fixed cover portion; and an operation member mechanically connected to the movable cover portion and configured to move the movable cover portion with respect to the fixed cover portion.

The present disclosure also discloses a cover. The cover may be attached to a power tool so as to cover at least a part of a tip tool, the power tool including a motor, a power transmission mechanism connected to the motor, a housing that houses the motor and the power transmission mechanism, a tip tool holder connected to the power transmission mechanism and holding the tip tool. The cover may include: a fixed cover portion fixed to the housing; a movable cover portion movable with respect to the fixed cover portion; and an operation member mechanically connected to the movable cover portion and configured to move the movable cover portion with respect to the fixed cover portion.

According to the power tool and the cover both described above, a user can move the movable cover portion with respect to the fixed cover portion by operating the operation member without grasping the movable cover portion. Even when the movable cover portion is to be moved while the tip tool is being driven, the movable cover portion can therefore be moved without requiring the user to bring his/her hand closer to the tip tool which is being driven near the movable cover portion. According to the power tool and the cover both described above, user safety can be improved.

DESCRIPTION OF EMBODIMENTS

Figure 1:
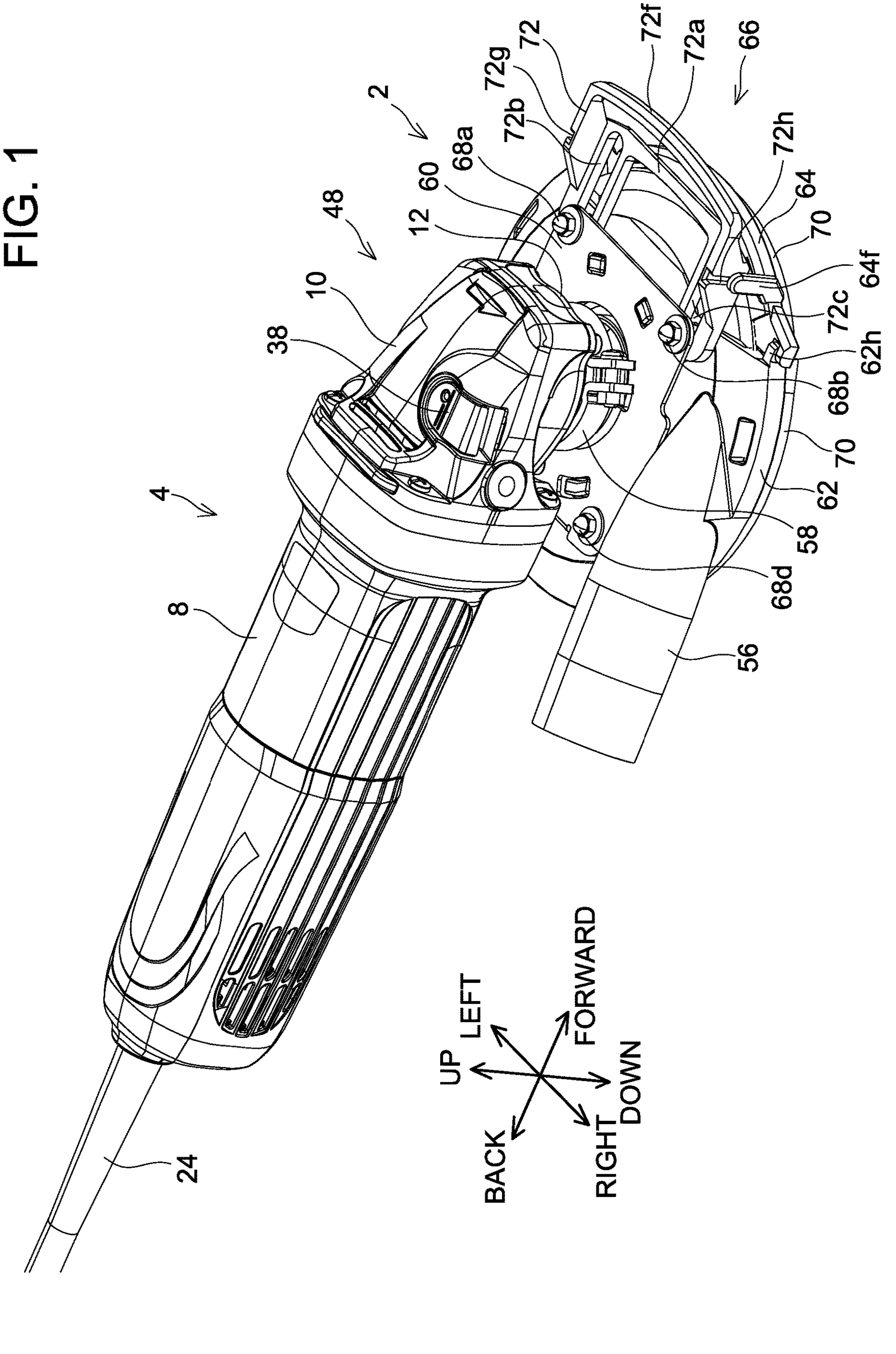
FIG. 1 is a perspective view of a grinder 4 to which a dust collector cover 2 of a first embodiment is attached, when viewed from front, right, and above.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved power tools and covers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a power tool may include: a motor; a power transmission mechanism connected to the motor; a housing that houses the motor and the power transmission mechanism; a tip tool holder connected to the power transmission mechanism and holding a tip tool; and a cover covering at least a part of the tip tool. The cover may include: a fixed cover portion fixed to the housing; a movable cover portion movable with respect to the fixed cover portion; and an operation member mechanically connected to the movable cover portion and configured to move the movable cover portion with respect to the fixed cover portion.

In one or more embodiments, a cover may be attached to a power tool so as to cover at least a part of a tip tool, the power tool including a motor, a power transmission mechanism connected to the motor, a housing that houses the motor and the power transmission mechanism, and a tip tool holder connected to the power transmission mechanism and holding the tip tool. The cover may include: a fixed cover portion fixed to the housing; a movable cover portion movable with respect to the fixed cover portion; and an operation member mechanically connected to the movable cover portion and configured to move the movable cover portion with respect to the fixed cover portion.

According to the power tool and the cover both described above, the movable cover portion can be moved with respect to the fixed cover portion in response to a user operating the operation member without grasping the movable cover portion. Due to this, even when the movable cover portion is to be moved while the tip tool is being driven, the movable cover portion can therefore be moved without requiring the user to bring his/her hand closer to the tip tool which is being driven near the movable cover portion. According to the power tool and the cover both described above, user safety can be improved.

In one or more embodiments, the operation member may include a contact portion configured to contact an obstacle before the movable cover portion and the tip tool contact the obstacle. When the contact portion is pushed by the obstacle, the movable cover portion may move with respect to the fixed cover portion in a direction exposing the tip tool.

According to the above-described configuration, when a work such as a floor surface is processed near an obstacle such as a wall surface, pressing the contact portion against the obstacle enables the movable cover portion to be moved with respect to the fixed cover portion, by which the tip tool can be exposed. The movable cover portion can be moved with respect to the fixed cover portion without a user touching the operation member, by which user convenience can be improved.

In one or more embodiments, the movable cover portion may be configured to move with respect to the fixed cover portion in a direction exposing the tip tool in response to a user manually operating the operation member.

According to the above-described configuration, in a case where the user seeks to expose the tip tool, the user manually operates the operation member to move the movable cover portion with respect to the fixed cover portion, by which the tap tool can be exposed.

In one or more embodiments, the cover may further include a biasing member configured to bias the operation member such that the movable cover portion moves with respect to the fixed cover portion in a direction covering the tip tool.

According to the above-described configuration, in a case where no external force acts on the operation member, the movable cover portion is moved with respect to the fixed cover portion by a biasing force of the biasing member, by which the tip tool is covered. According to the above-described configuration, the tip tool is not left exposed, by which user safety can further be improved.

In one or more embodiments, the tip tool may be rotatable around a rotation axis with respect to the housing. The operation member may be movable with respect to the fixed cover portion along a sliding direction substantially orthogonal to the rotation axis.

In many cases, the cover covering at least a part of the tip tool has a shape expanding in a direction orthogonal to the rotation axis of the tip tool. According to the above-described configuration, a direction in which the operation member moves can be a direction along an outer shape of the cover, by which the cover can be downsized.

In one or more embodiments, the movable cover portion may be pivotable around a pivot axis substantially parallel to the rotation axis with respect to the fixed cover portion.

According to the above-described configuration, when pivoted with respect to the fixed cover portion, the movable cover portion moves in a direction separating away from the tip tool and the work, which can prevent the movable cover portion from hindering the working process.

In one or more embodiments, the movable cover portion may be pivotable around a pivot axis substantially orthogonal to the rotation axis and the sliding direction with respect to the fixed cover portion.

According to the above-described configuration, when pivoted with respect to the fixed cover portion, the movable cover portion moves in a direction separating away from the tip tool and the work, which can prevent the movable cover portion from hindering the working process.

In one or more embodiments, one of the operation member and the movable cover portion may include a cam groove. The other one of the operation member and the movable cover portion may include a cam protrusion slidable inside the cam groove. When the operation member is moved with respect to the fixed cover portion in the sliding direction, the movable cover portion may pivot around the pivot axis.

According to the above-described configuration, the pivot of the movable cover portion in conjunction with the movement of the operation member can be realized with a simple configuration.

First Embodiment

Figure 2:
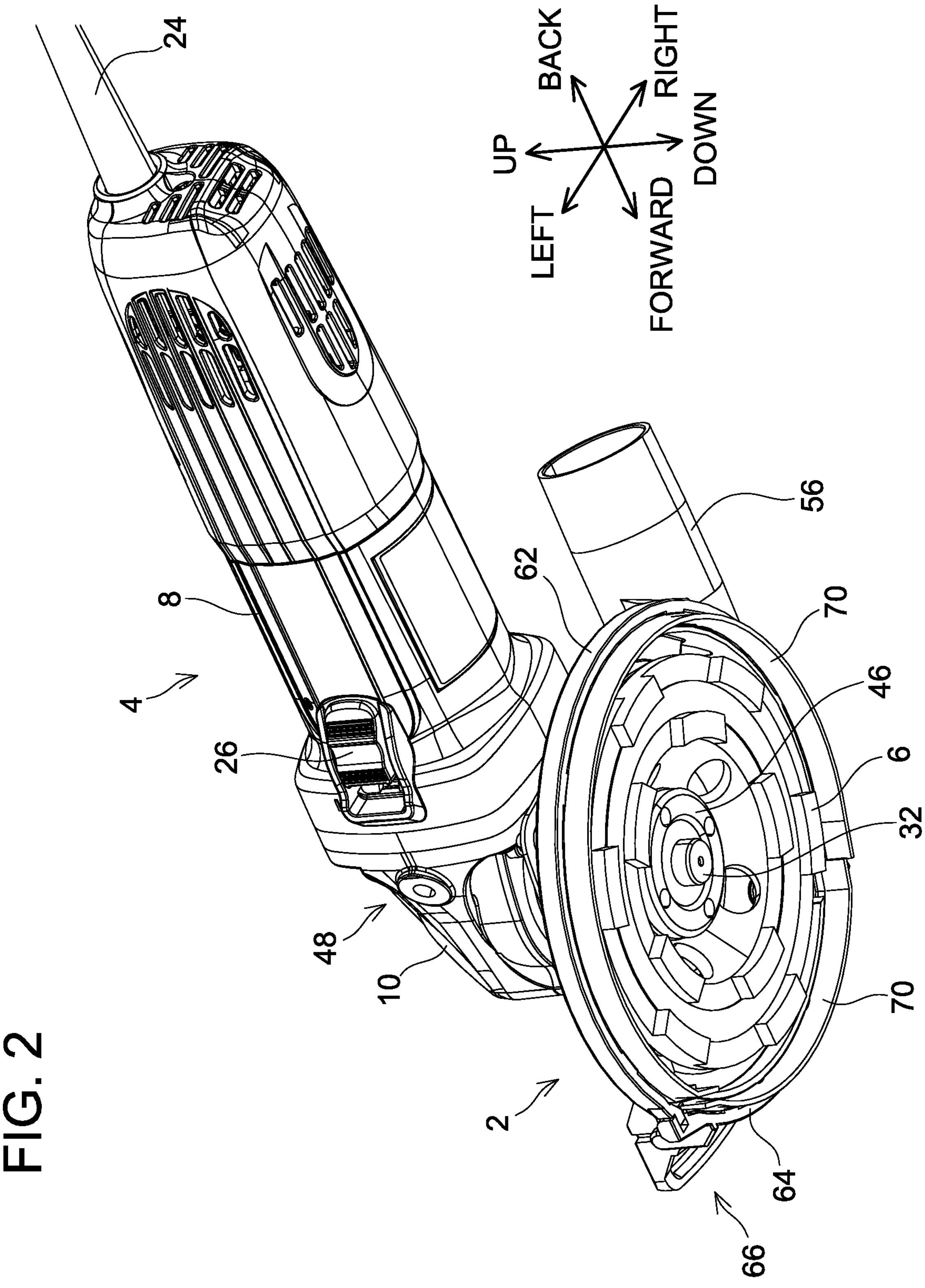
FIG. 2 is a perspective view of the grinder 4 to which the dust collector cover 2 of the first embodiment is attached, when viewed from rear, left, and below.

As shown in FIG. 1, a dust collector cover 2 of the present embodiment is attached to a grinder 4 when in use. As shown in FIG. 2, the grinder 4 can grind a work made of concrete, block, brick, stone, and the like by rotation of a diamond cup 6. In the following description, a longitudinal direction of the grinder 4 is termed a front-rear direction, a direction of a rotation axis of the diamond cup 6 is termed an up-down direction, and a direction orthogonal to the front-rear direction and the up-down direction termed a right-left direction.

Figure 3:
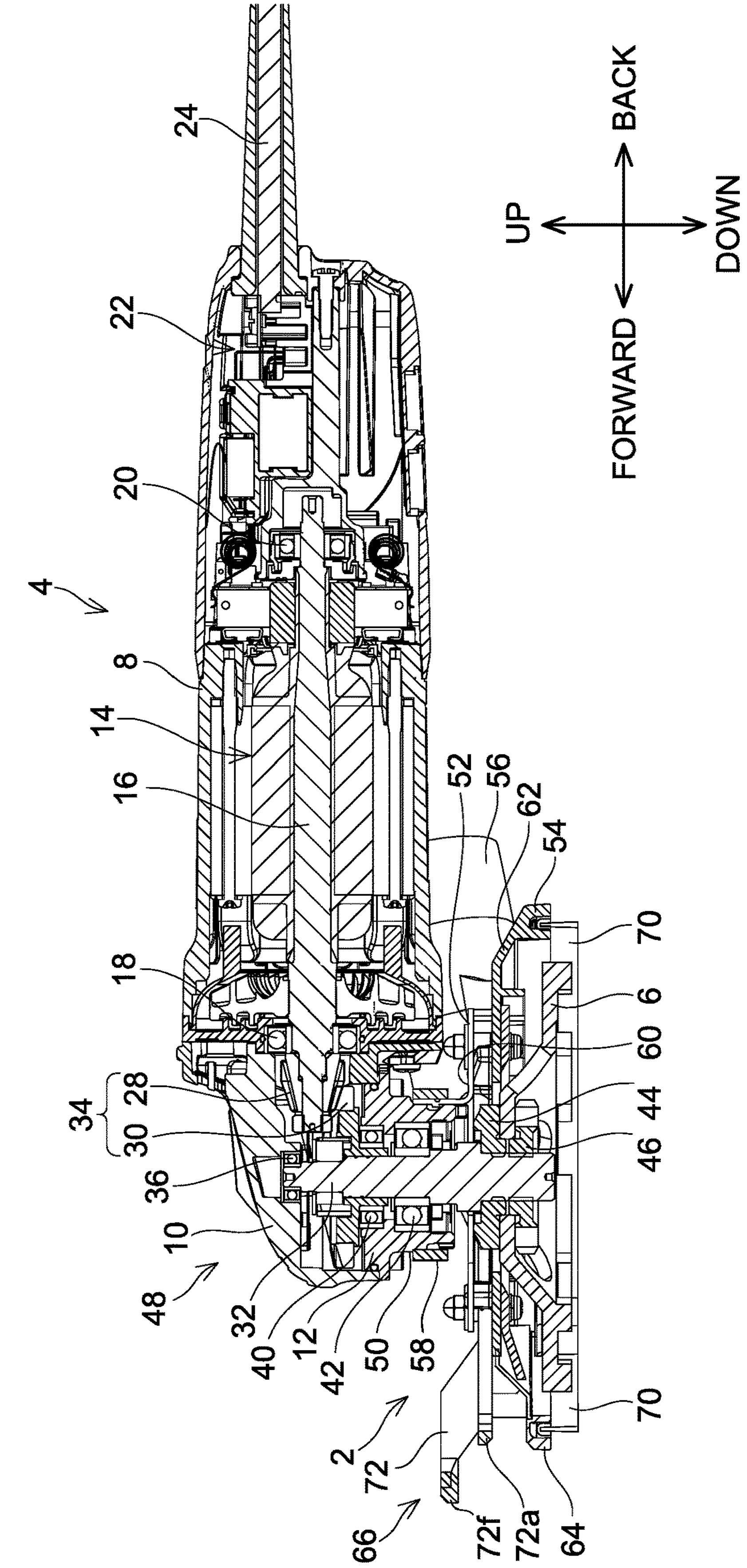
FIG. 3 is a vertical cross-sectional view of the grinder 4 to which the dust collector cover 2 of the first embodiment is attached.

As shown in FIG. 3, the grinder 4 includes a body housing 8, a gear housing 10, and a bearing box 12.

The body housing 8 houses a motor 14 in its front portion. The motor 14 includes an output shaft 16 extending in the front-rear direction. The output shaft 16 is rotatably supported by the body housing 8 via bearings 18, 20. The body housing 8 houses a power circuit 22 in its rear portion. Electric power is supplied to the power circuit 22 from an external power source via a power cord 24. The power circuit 22 supplies electric power to the motor 14 when a user turns on a switch 26 (see FIG. 2 and the like), and stops supply of electric power to the motor 14 when the user turns off the switch 26. The motor 14 rotates the output shaft 16 by electric power supplied from the power circuit 22.

The gear housing 10 is attached forward of the body housing 8. The gear housing 10 houses a first bevel gear 28 and a second bevel gear 30 that are disposed to mesh with each other. The first bevel gear 28 is fixed to a front end of the output shaft 16. The second bevel gear 30 is fixed to an upper end of a spindle 32 extending in the up-down direction. Hereafter, the first bevel gear 28 and the second bevel gear 30 will also collectively and simply be termed bevel gears 34. The bevel gears 34 are a reduction gear mechanism that reduces and transmits rotation of the motor 14 to the spindle 32 and can be termed a power transmission mechanism. The gear housing 10 holds the upper end of the spindle 32 via a bearing 36. As shown in FIG. 1, a shaft lock 38 is provided on an upper surface of the gear housing 10. When a user pushes the shaft lock 38 downward, rotation of the second bevel gear 30 is prohibited, by which rotation of the spindle 32 is prohibited.

As shown in FIG. 3, the bearing box 12 is attached below the gear housing 10. The bearing box 12 holds the spindle 32 via bearings 40, 42. The spindle 32 is rotatable about a rotation axis along the up-down direction with respect to the bearing box 12. The diamond cup 6 is attachable to a lower end of the spindle 32 via an inner flange 44 and an outer flange 46. The inner flange 44 is fitted to the spindle 32. The diamond cup 6 is attached to the spindle 32 from below the inner flange 44 and is fitted onto the inner flange 44. The outer flange 46 is screwed on the spindle 32 from the lower end of the spindle 32 to clamp the diamond cup 6 between the outer flange 46 and the inner flange 44. In the grinder 4, when the motor 14 rotates, the diamond cup 6 rotates around the rotation axis together with the spindle 32, by which a work can be ground. The spindle 32 can also be termed a tip tool holder holding the diamond cup 6 which is a tip tool. In the following description, the body housing 8, the gear housing 10, and the bearing box 12 will also collectively and simply be termed a housing 48.

The dust collector cover 2 is attached to a substantially cylindrical cover attachment portion 50 defined in the bearing box 12. The dust collector cover 2 is formed into a shape that covers around the diamond cup 6 when attached to the grinder 4. The dust collector cover 2 is used to prevent grinding swarf from scattering around and collect the grinding swarf with a dust collector (not shown) when the diamond cup 6 grinds a work.

Figure 4:
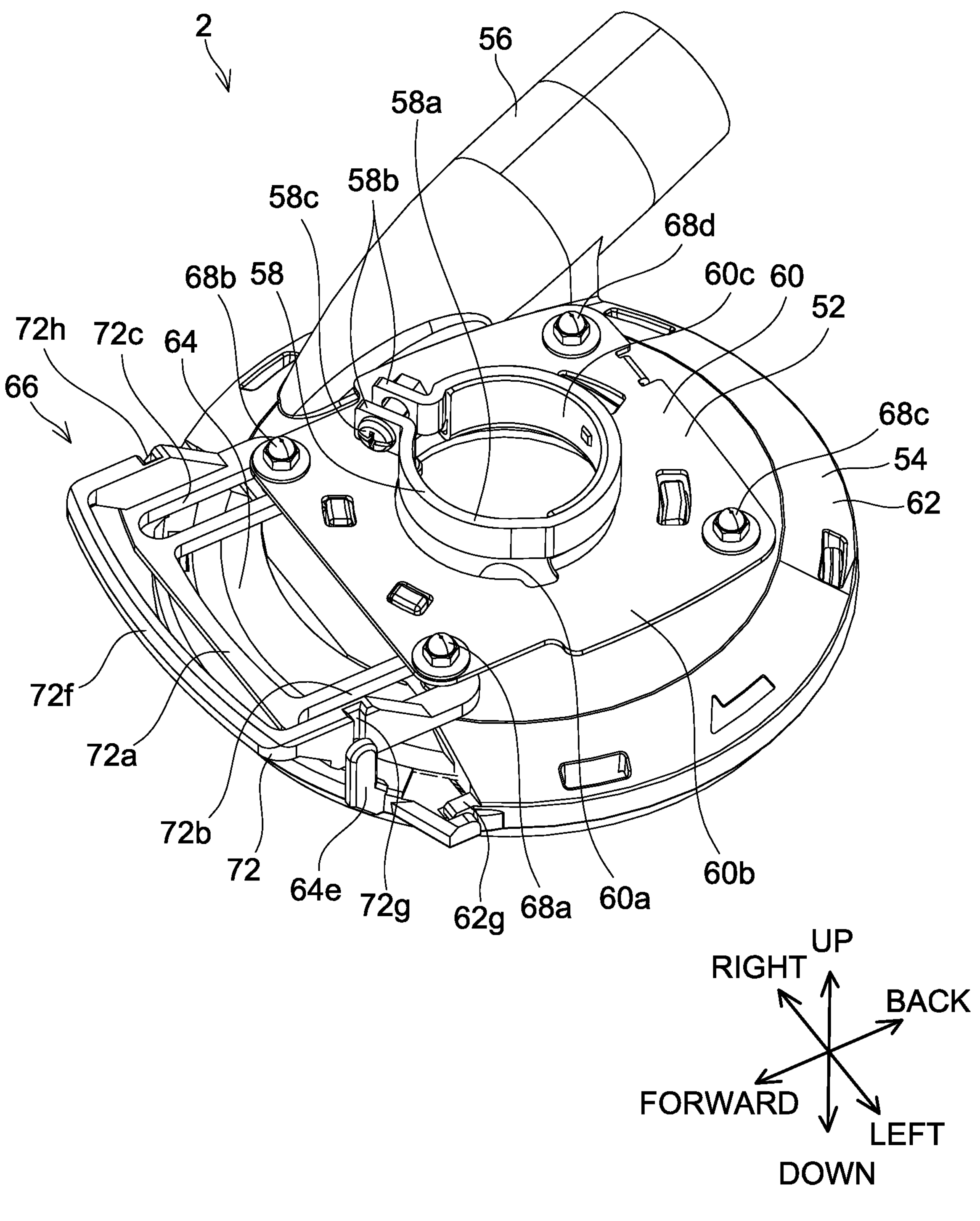
FIG. 4 is a perspective view of the dust collector cover 2 of the first embodiment.

As shown in FIG. 4, the dust collector cover 2 includes a base 52 cover body 54, and a nozzle 56.

The base 52 includes a band 58 and a base plate 60. The band 58 includes a curved portion **58*a* constituted of a band-like flat plate curved into a cylindrical shape, a pair of flat plate portions 58*b* extending outward from opposite ends of the curved portion 58*a*, and a fastener 58*c* adjusting a spacing between the pair of flat plate portions 58*b*. The base plate 60 includes a flat plate portion 60*b* including an opening 60*a* substantially circular in shape, and a semicylindrical portion 60*c* semicylindrical in shape and bent upward along an edge of the opening 60*a*. The band 58 and the base plate 60 are fixed to each other by welding an outer peripheral surface of the semicylindrical portion 60*c* and an inner peripheral surface of the curved portion 58*a*. The dust collector cover 2 is fixed to the bearing box 12 by attaching the band 58 to an outer peripheral surface of the cover attachment portion 50 of the bearing box 12 with the fastener 58*c* loosened to increase a diameter of the band 58 and then tightening the fastener 58*c* to decrease the diameter of the band 58**.

The cover body 54 includes a fixed cover portion 62, a movable cover portion 64, and a cover opening/closing mechanism 66. The fixed cover portion 62 is disposed below the base 52. The fixed cover portion 62 is fixed to the base plate 60 of the base 52 via fasteners **68*a*, 68*b*, 68*c*, 68*d*. The movable cover portion 64 is disposed forward of the fixed cover portion 62. The fixed cover portion 62 and the movable cover portion 64 are formed to have a dish shape when combined with each other. A dust collector brush 70 (see FIG. 2) is provided below an outer edge of the fixed cover portion 62 and an outer edge of the movable cover portion 64. When a work is ground with the grinder 4, the fixed cover portion 62, the movable cover portion 64, and the dust collector brush 70 cover around the diamond cup 6. The nozzle 56 is formed integrally with the fixed cover portion 62. The nozzle 56 has an internal space communicating with an inner space of the fixed cover portion 62. A hose (not shown) extending from the dust collector (not shown) can be attached to the nozzle 56**.

Figure 5:
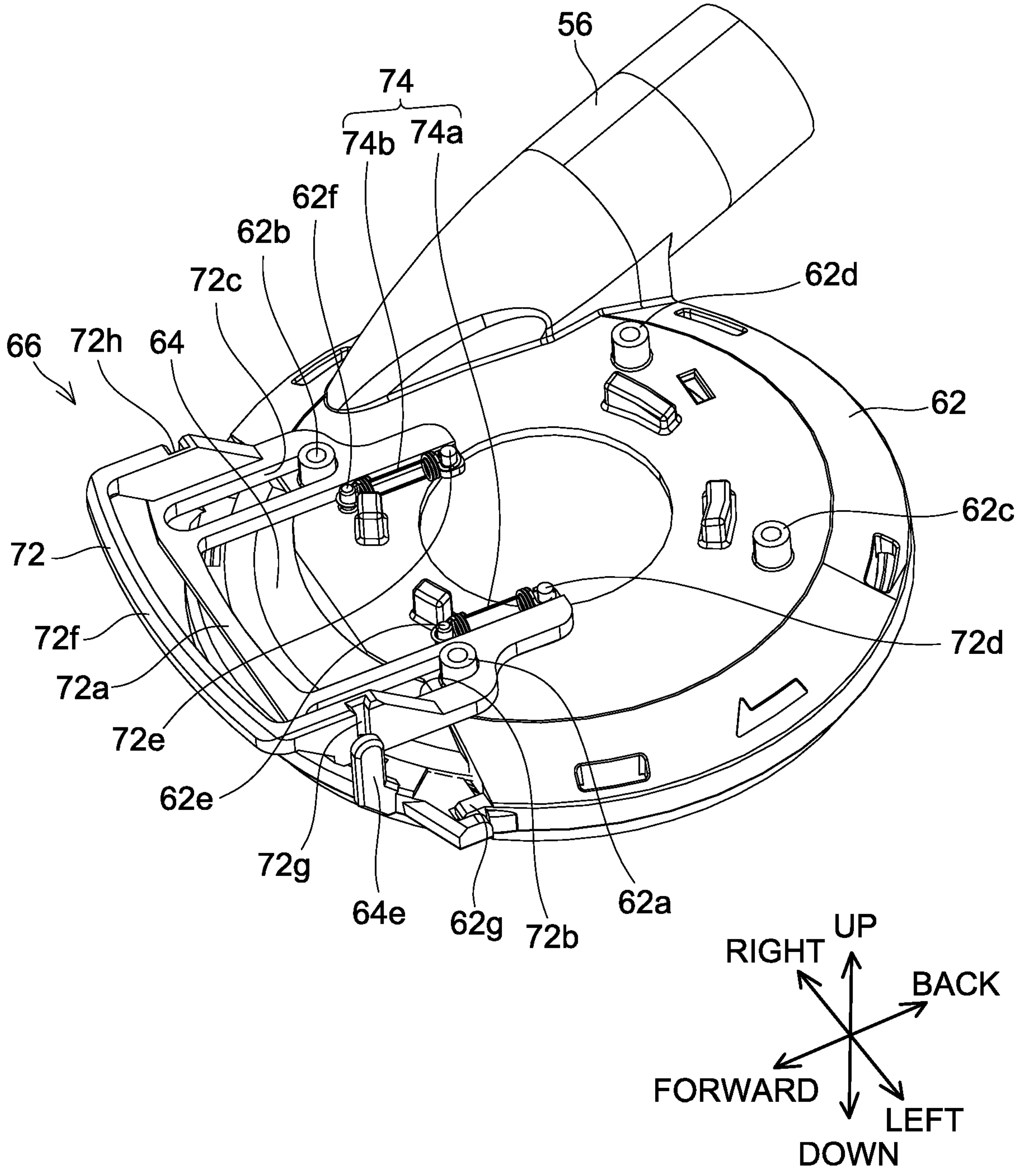
FIG. 5 is a perspective view of the dust collector cover 2 of the first embodiment, with a base 52 detached therefrom.

As shown in FIG. 5, the cover opening/closing mechanism 66 includes an operation member 72 and an elastic member 74.

Figure 6:
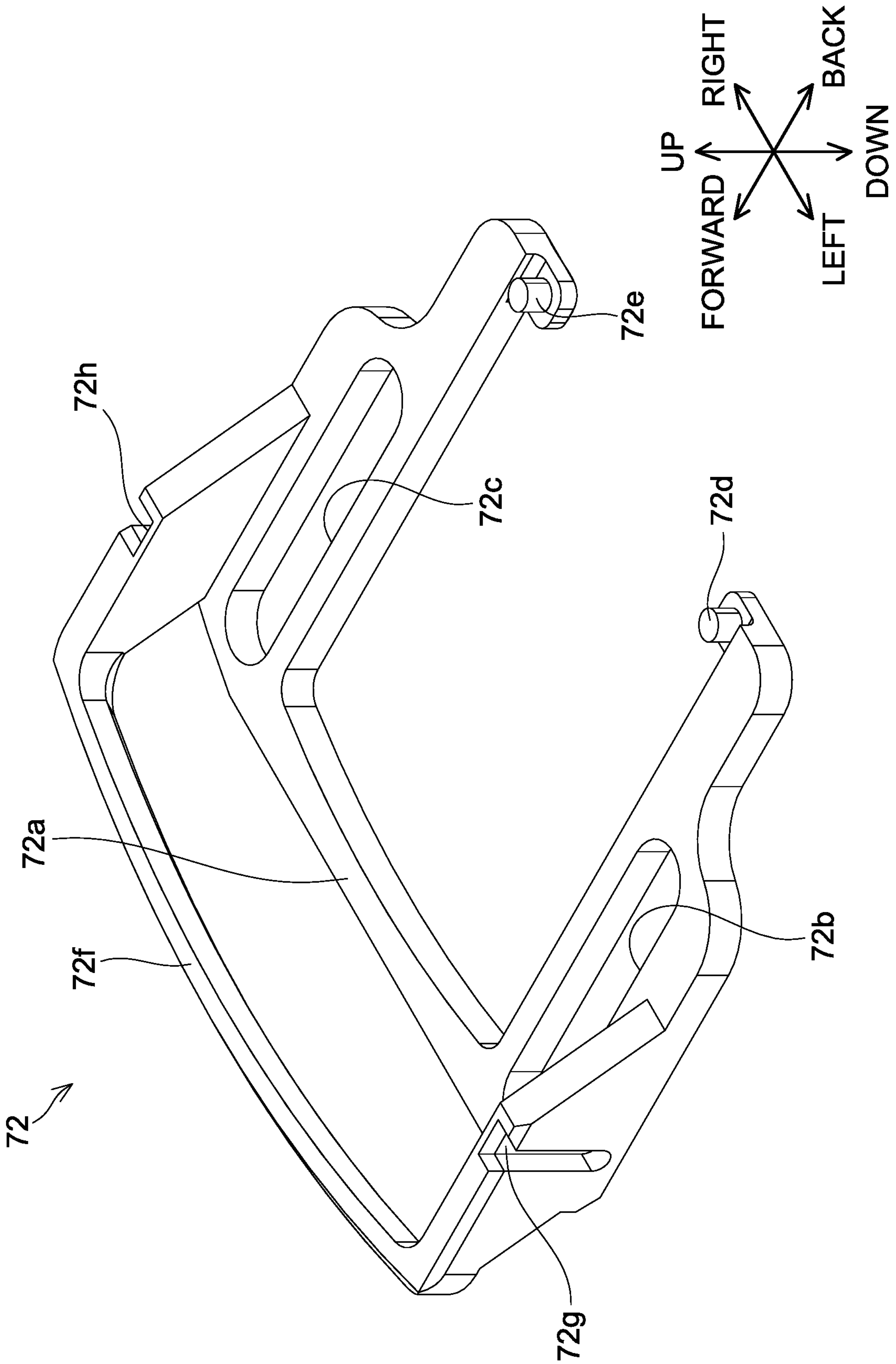
FIG. 6 is a perspective view of an operation member 72 of the dust collector cover 2 of the first embodiment.

As shown in FIG. 6, the operation member 72 includes a flat plate-like base portion 72*a* substantially Π-shaped with its rear portion opened in plan view from above, long holes 72*b*, 72*c* defined in the base portion 72*a* and each having a longitudinal direction along the front-rear direction, protrusions 72*d*, 72*e* provided on upper surfaces of rear ends of the base portion 72*a*, a contact portion 72*f* provided at a position shifted upward relative to the base portion 72*a* and substantially Π-shaped with its rear portion opened in plan view from above, and cam grooves 72*g*, 72*h* defined in end surfaces of the contact portion 72*f* in the right-left direction and each having a longitudinal direction along the up-down direction.

As shown in FIG. 5, bosses 62*a*, 62*b*, 62*c*, 62*d* that receive the fasteners 68*a*, 68*b*, 68*c*, 68*d* are provided on an upper surface of the fixed cover portion 62. With the operation member 72 attached to the fixed cover portion 62, the boss 62*a* of the fixed cover portion 62 penetrates the long hole 72*b* in the operation member 72, and the boss 62*b* of the fixed cover portion 62 penetrates the long hole 72*c* in the operation member 72. The boss 62*a* is slidable inside the long hole 72*b* in the front-rear direction, and the boss 62*b* is slidable inside the long hole 72*c* in the front-rear direction. The operation member 72 is thereby supported movably in the front-rear direction with respect to the fixed cover portion 62.

The elastic member 74 includes extension springs 74*a*, 74*b*. Protrusions 62*e*, 62*f* are provided on the upper surface of the fixed cover portion 62 With the operation member 72 attached to the fixed cover portion 62, the protrusion 62*e* of the fixed cover portion 62 and the protrusion 72*d* of the operation member 72 are connected by the extension spring 74*a*, and the protrusion 62*f* of the fixed cover portion 62 and the protrusion 72*e* of the operation member 72 are connected by the extension spring 74*b*. The extension springs 74*a*, 74*b* bias the operation member 72 forward with respect to the fixed cover portion 62.

Figure 7:
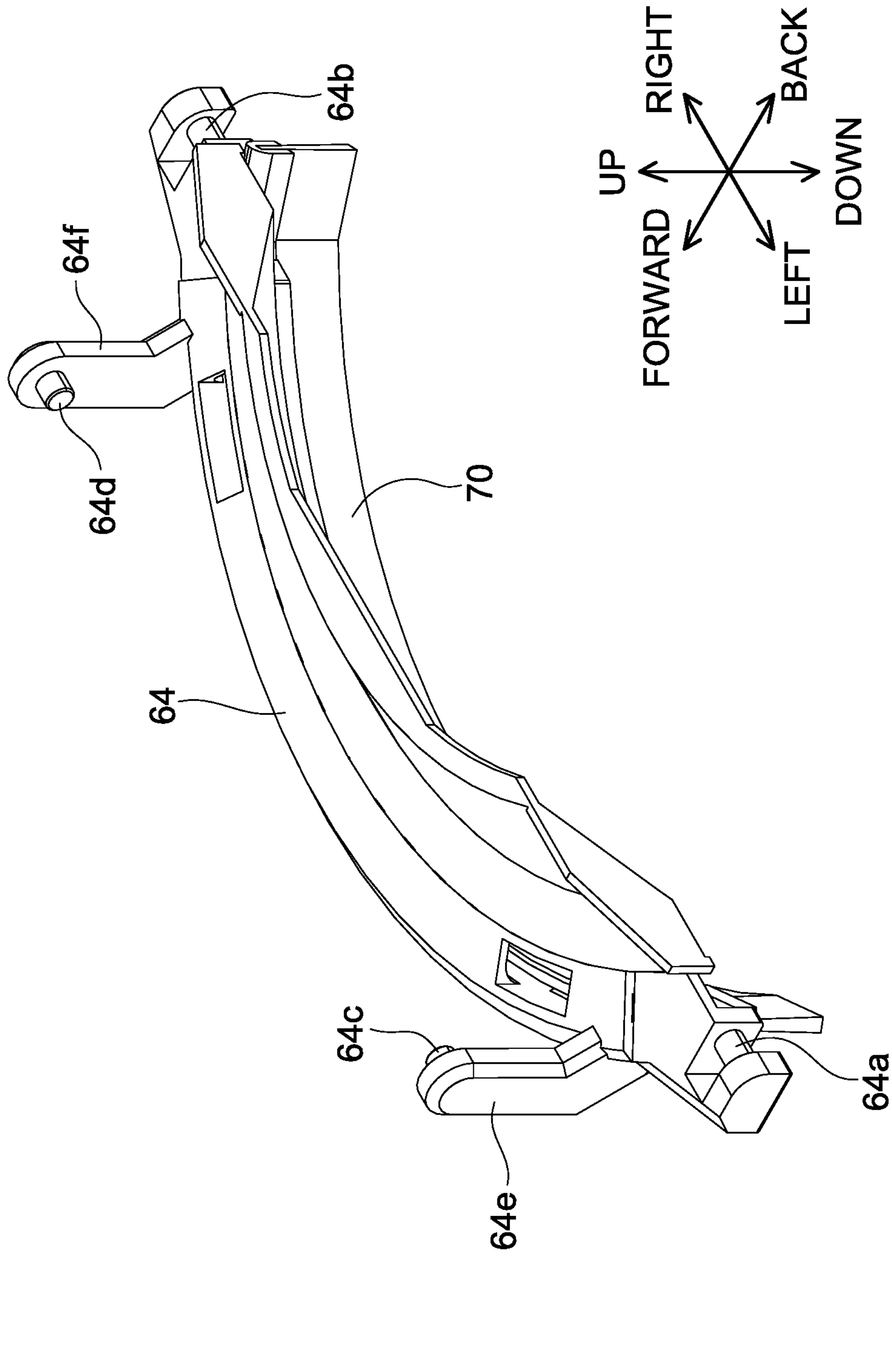
FIG. 7 is a perspective view of a movable cover portion 64 of the dust collector cover 2 of the first embodiment.
Figure 8:
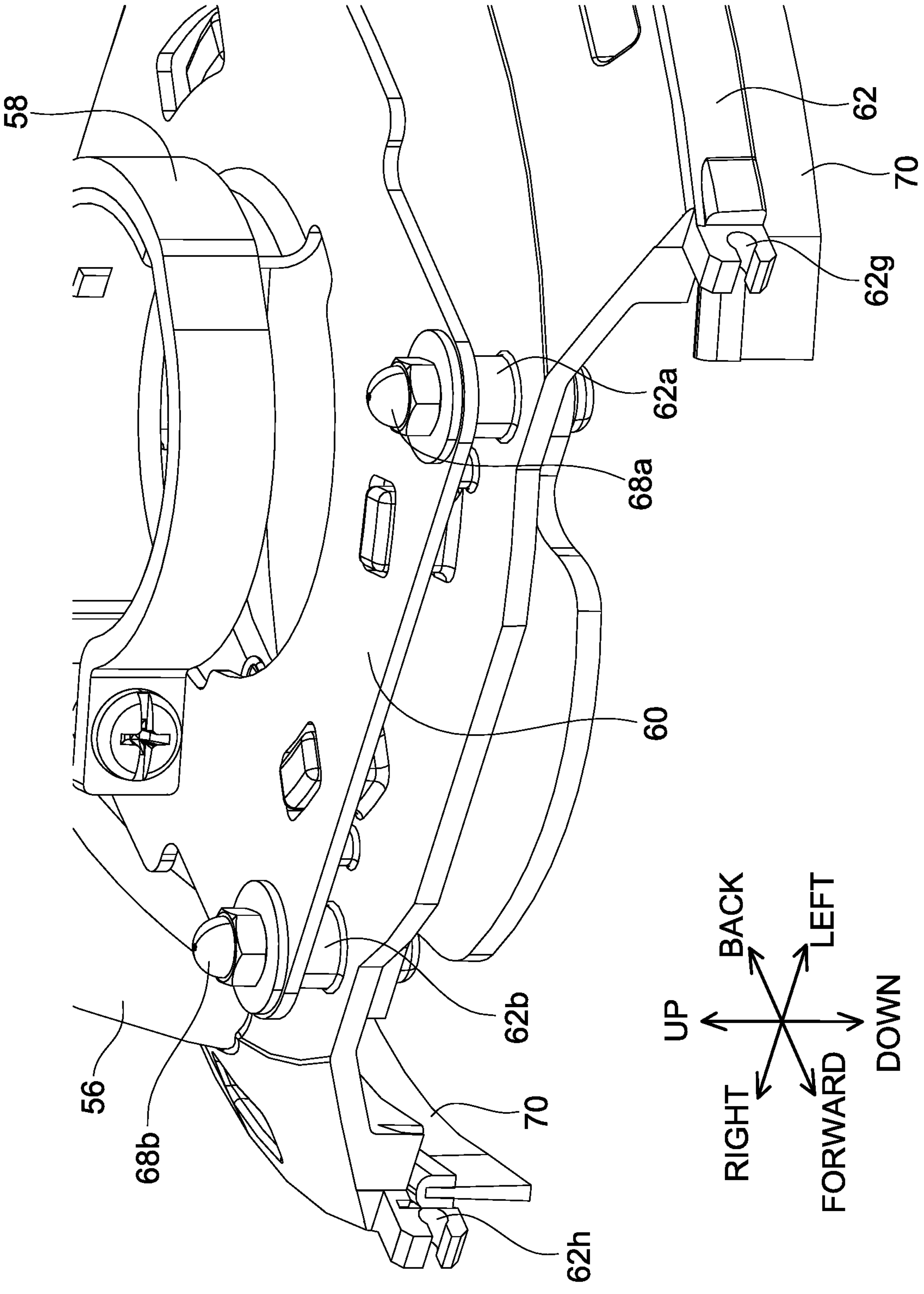
FIG. 8 is a perspective view of a front end of a fixed cover portion 62 of the dust collector cover 2 of the first embodiment.

As shown in FIG. 7, pivot shafts 64*a*, 64*b* are formed at rear ends of the movable cover portion 64, near ends in the right-left direction. The pivot shafts 64*a*, 64*b* are each formed into a substantially columnar shape having an axial direction along the right-left direction. As shown in FIG. 8, holding portions 62*g*, 62*h* are provided at front ends of the fixed cover portion 62, near ends in the right-left direction. The pivot shafts 64*a*, 64*b* of the movable cover portion 64 are detachable from and attachable to the holding portions 62*g*, 62*h*. With the movable cover portion 64 attached to the fixed cover portion 62, the holding portions 62*g*, 62*h* pivotably hold the pivot shafts 64*a*, 64*b*. With the movable cover portion 64 attached to the fixed cover portion 62, the movable cover portion 64 is therefore pivotable around a pivot axis along the right-left direction with respect to the fixed cover portion 62.

As shown in FIG. 7, cam protrusions 64*c*, 64*d* corresponding to the cam grooves 72*g*, 72*h* in the operation member 72, and arms 64*e*, 64*f* supporting the cam protrusions 64*c*, 64*d* are provided on the movable cover portion 64. The cam protrusions 64*e*, 64*d* are disposed at positions forward of, and upward of, the pivot shafts 64*a*, 64*b*. As shown in FIG. 5, with the movable cover portion 64 and the operation member 72 attached to the fixed cover portion 62, the cam protrusion 64*c* of the movable cover portion 64 is inserted into the cam groove 72*g* in the operation member 72, and the cam protrusion 64*d* of the movable cover portion 64 is inserted into the cam groove 72*h* in the operation member 72. The cam protrusions 64*c*, 64*d* are slidable inside the cam grooves 72*g*, 72*h* in the up-down direction.

As shown in FIG. 5, in a state where no external force acts on the contact portion 72*f* of the operation member 72, the operation member 72 is moved to a position forward with respect to the fixed cover portion 62 by a biasing force of the elastic member 74. In this state, the movable cover portion 64 is closed with respect to the fixed cover portion 62. In this state, the contact portion 72*f* of the operation member 72 is disposed at a position forward of a front end of the movable cover portion 64.

Figure 9:
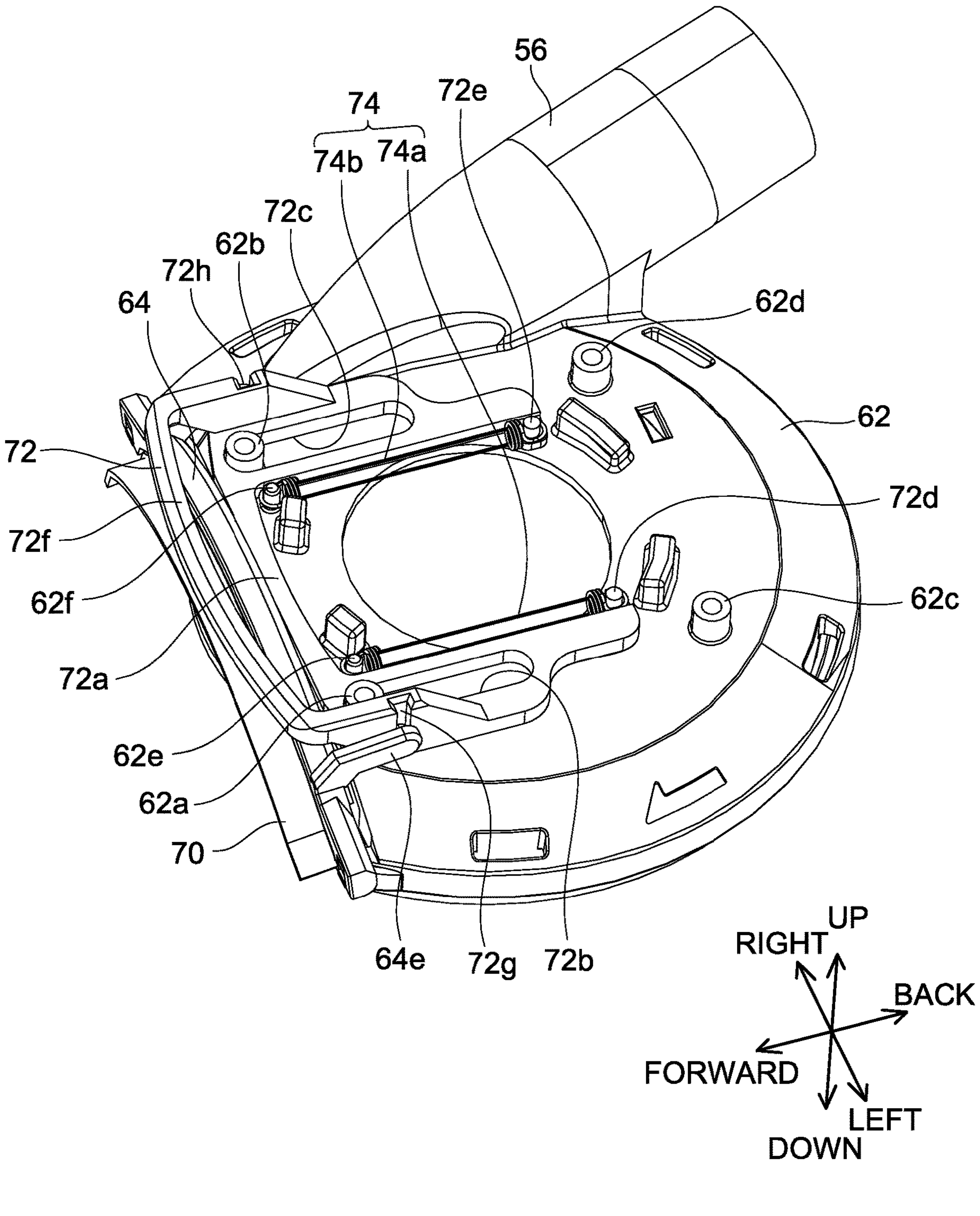
FIG. 9 is a perspective view of the dust collector cover 2 of the first embodiment, with the base 52 detached therefrom and with the operation member 72 moved rearward.

As shown in FIG. 9, when external force acts rearward on the contact portion 72*f* of the operation member 72 and causes the operation member 72 to move to a position rearward with respect to the fixed cover portion 62 against the biasing force of the elastic member 74, the cam protrusions 64*c*, 64*d* of the movable cover portion 64 also move rearward, by which the movable cover portion 64 pivots in a direction opening with respect to the fixed cover portion 62. As such, in the dust collector cover 2 of the present embodiment, pushing the operation member 72 rearward against the biasing force of the elastic member 74 enables the movable cover portion 64 to pivot in the direction opening with respect to the fixed cover portion 62.

Figure 10:
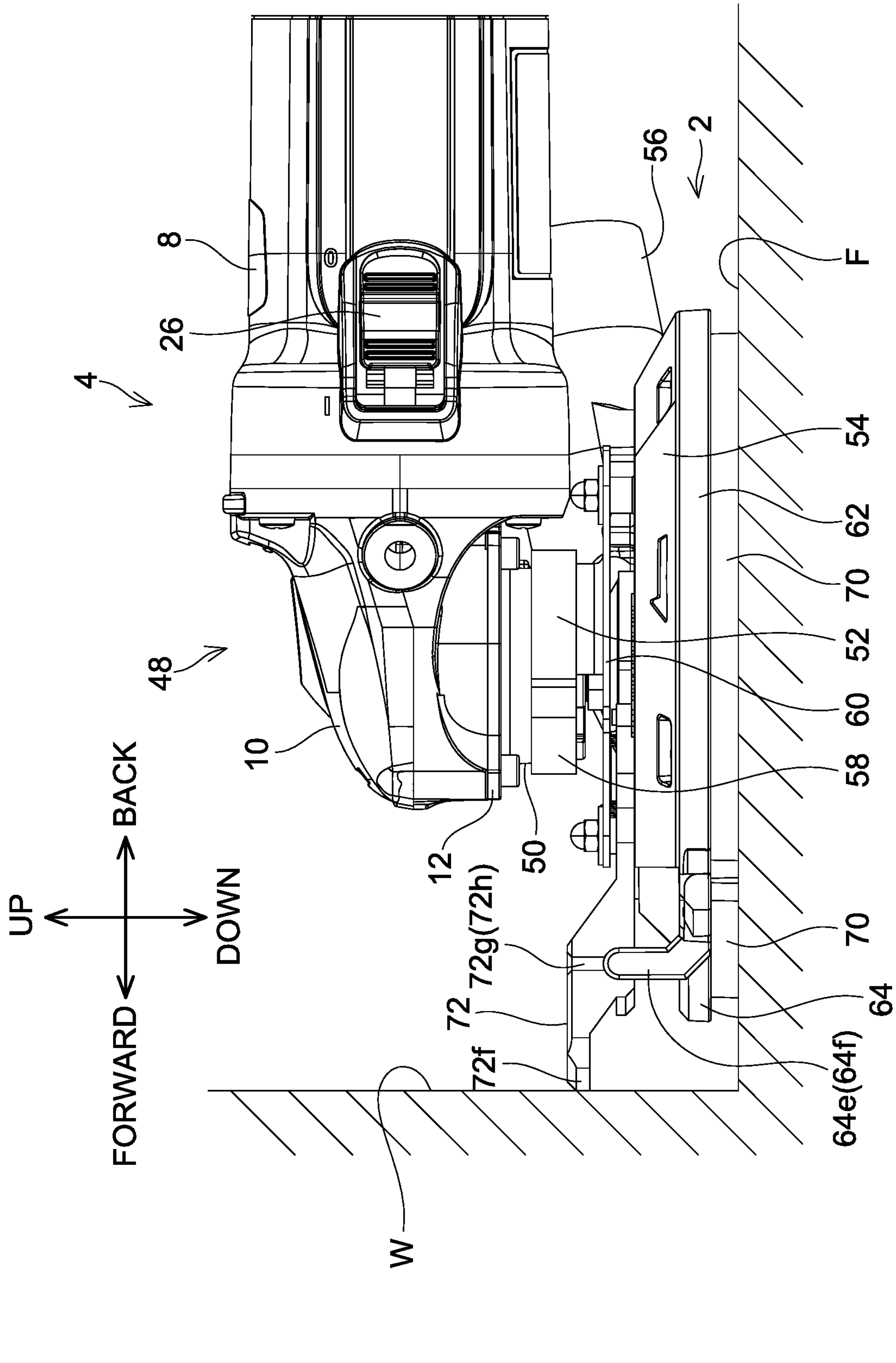
FIG. 10 is a side view of the grinder 4 to which the dust collector cover 2 of the first embodiment is attached, with the movable cover portion 64 closed when a floor surface F near a wall surface W is ground.
Figure 11:
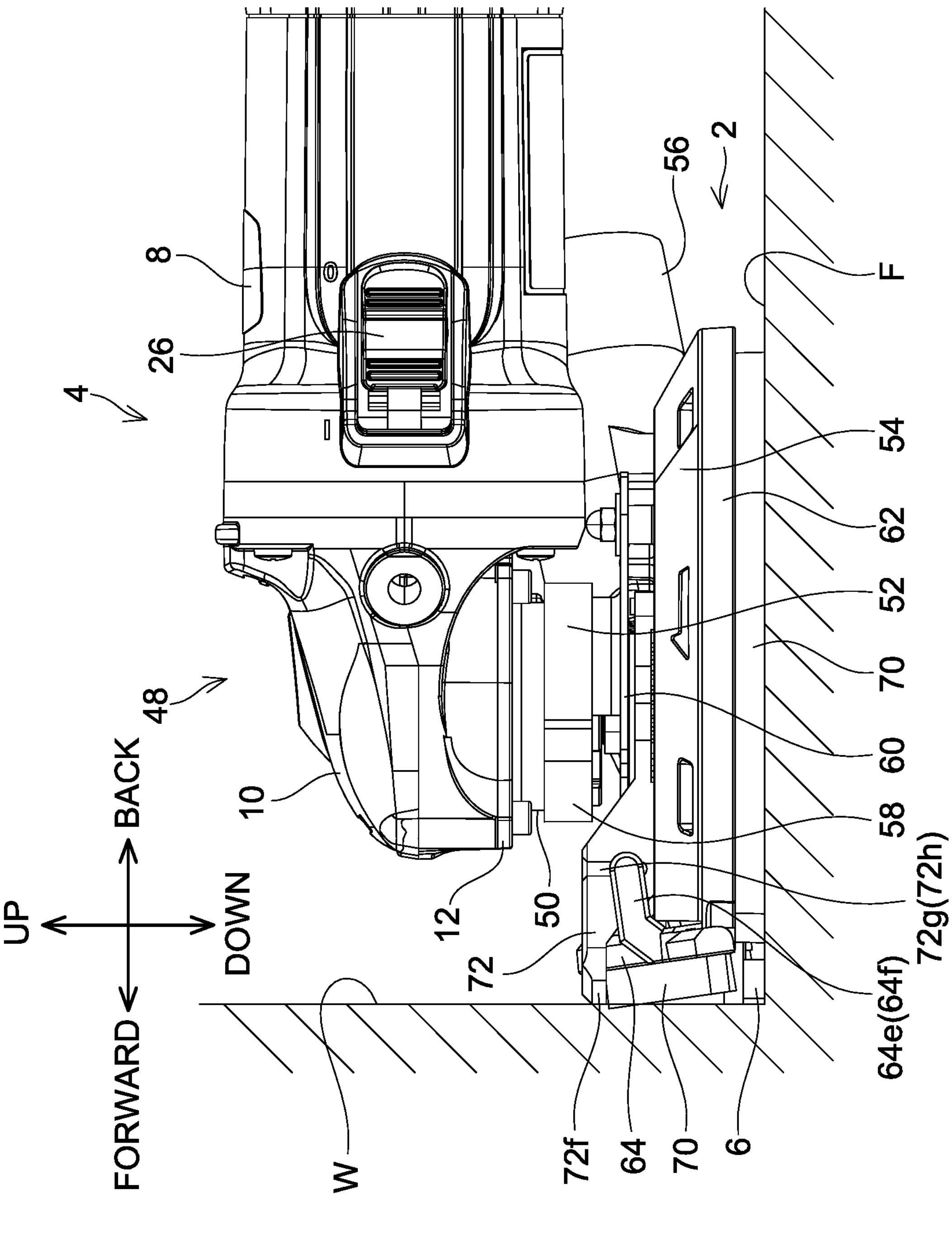
FIG. 11 is a side view of the grinder 4 to which the dust collector cover 2 of the first embodiment is attached, with the movable cover portion 64 opened when the floor surface F near the wall surface W is ground.

As shown in FIG. 10, there may be a case where the grinder 4 is used to grind a floor surface F near a wall surface W. In such a case, in the dust collector cover 2 of the present embodiment, pushing the grinder 4 toward the wall surface W with the contact portion 72*f* of the operation member 72 contacting the wall surface W causes an external force pushing the operation member 72 rearward to act on the contact portion 72*f* from the wall surface W. As shown in FIG. 11, this enables the movable cover portion 64 to pivot in the direction opening with respect to the fixed cover portion 62, by which the diamond cup 6 can be exposed partially. The floor surface F near the wall surface W can be ground with the diamond cup 6. Instead of using the wall surface W, a user may grasp the contact portion 72*f* of the operation member 72 to push the contact portion 72*f* rearward, by which the movable cover portion 64 can pivot in the direction opening with respect to the fixed cover portion 62, by which the diamond cup 6 can be exposed partially.

As described above, in one or more embodiments, the grinder 4 (an example of a power tool) includes: the motor 14; the bevel gears 34 (an example of a power transmission mechanism) connected to the motor 14; the housing 48 that houses the motor 14 and the bevel gears 34; the spindle 32 (an example of a tip tool holder) connected to the bevel gears 34 and holding the diamond cup 6 (an example of a tip tool); and the dust collector cover 2 (an example of a cover) covering at least a part of the diamond cup 6. The dust collector cover 2 includes: the fixed cover portion 62 fixed to the housing 48; the movable cover portion 64 movable with respect to the fixed cover portion 62; and the operation member 72 mechanically connected to the movable cover portion 64 and configured to move the movable cover portion 64 with respect to the fixed cover portion 62.

In one or more embodiments, the dust collector cover 2 is attached to the grinder 4 (an example of a power tool) so as to cover at least a part of the diamond cup 6, the grinder 4 including the motor 14, the bevel gears 34 connected to the motor 14, the housing 48 that houses the motor 14 and the bevel gears 34, and the spindle 32 connected to the bevel gears 34 and holding the diamond cup 6. The dust collector cover 2 includes: the fixed cover portion 62 fixed to the housing 48; the movable cover portion 64 movable with respect to the fixed cover portion 62; and the operation member 72 mechanically connected to the movable cover portion 64 and configured to move the movable cover portion 64 with respect to the fixed cover portion 62.

According to the grinder 4 and the dust collector cover 2 both described above, a user can move the movable cover portion 64 with respect to the fixed cover portion 62 by operating the operation member 72 without grasping the movable cover portion 64. Even when the movable cover portion 64 is to be moved while the diamond cup 6 is being driven, the movable cover portion 64 can therefore be moved without requiring the user to bring his/her hand closer to the diamond cup 6 which is being driven near the movable cover portion 64. According to the grinder 4 and the dust collector cover 2 both described above, user safety can be improved.

In one or more embodiments, the operation member 72 includes the contact portion **72*f* configured to contact the wall surface W (an example of an obstacle) before the movable cover portion 64 and the diamond cup 6 contact the wall surface W. When the contact portion 72*f* is pushed by the wall surface W, the movable cover portion 64 moves with respect to the fixed cover portion 62 in a direction exposing the diamond cup 6**.

According to the above-described configuration, when a work such as the floor surface F is processed near an obstacle such as the wall surface W, pressing the contact portion **72*f* against the obstacle enables the movable cover portion 64 to be moved with respect to the fixed cover portion 62, by which the diamond cup 6 can be exposed. The movable cover portion 64 can be moved with respect to the fixed cover portion 62 without a user touching the operation member 72**, by which user convenience can be improved.

In one or more embodiments, the movable cover portion 64 is configured to move with respect to the fixed cover portion 62 in a direction exposing the diamond cup 6 in response to a user manually operating the operation member 72.

According to the above-described configuration, in a case where the user seeks to expose the diamond cup 6, the user manually operates the operation member 72 to move the movable cover portion 64 with respect to the fixed cover portion 62, by which the diamond cup 6 can be exposed.

In one or more embodiments, the dust collector cover 2 further includes the elastic member 74 (an example of a biasing member) configured to bias the operation member 72 such that the movable cover portion 64 moves with respect to the fixed cover portion 62 in a direction covering the diamond cup 6.

According to the above-described configuration, in a case where no external force acts on the operation member 72, the movable cover portion 64 is moved with respect to the fixed cover portion 62 by a biasing three of the elastic member 74, by which the diamond cup 6 is covered. According to the above-described configuration, the diamond cup 6 is not left exposed, by which user safety can further be improved.

In one or more embodiments, the diamond cup 6 is rotatable around a rotation axis with respect to the housing 48. The operation member 72 is movable with respect to the fixed cover portion 62 along a sliding direction (e.g., the front-rear direction) substantially orthogonal to the rotation axis of the diamond cup 6.

The dust collector cover 2 covering at least a part of the diamond cup 6 has a shape expanding in a direction (the front-rear direction and the right-left direction) orthogonal to the rotation axis of the diamond cup 6. According to the above-described configuration, a direction in which the operation member 72 moves can be a direction along an outer shape of the dust collector cover 2, by which the dust collector cover 2 can be downsized.

In one or more embodiments, the movable cover portion 64 is pivotable around a pivot axis (e.g., the right-left direction) substantially orthogonal to the rotation axis of the diamond cup 6 and the sliding direction of the operation member 72 with respect to the fixed cover portion 62.

According to the above-described configuration, when pivoted with respect to the fixed cover portion 62, the movable cover portion 64 moves in a direction separating away from the diamond cup 6 and the work, which can prevent the movable cover portion 64 from hindering the working process.

In one or more embodiments, one of the operation member 72 and the movable cover portion 64 (e.g., the operation member 72) includes the cam grooves **72*g*, 72*h*. The other one of the operation member 72 and the movable cover portion 64 (e.g., the movable cover portion 64) includes the cam protrusions 64*c*, 64*d* slidable inside the cam grooves 72*g*, 72*h*. When the operation member 72 is moved with respect to the fixed cover portion 62 in the sliding direction, the movable cover portion 64** pivots around the pivot axis.

According to the above-described configuration, the pivot of the movable cover portion 64 in conjunction with the movement of the operation member 72 can be realized with a simple configuration.

Second Embodiment

A dust collector cover 102 of the present embodiment, like the dust collector cover 2 of the first embodiment, is attached to the grinder 4 when in use. For the dust collector cover 102 of the present embodiment, only the differences between the dust collector cover 102 and the dust collector cover 2 of the first embodiment will hereinafter be described in detail.

Figure 12:
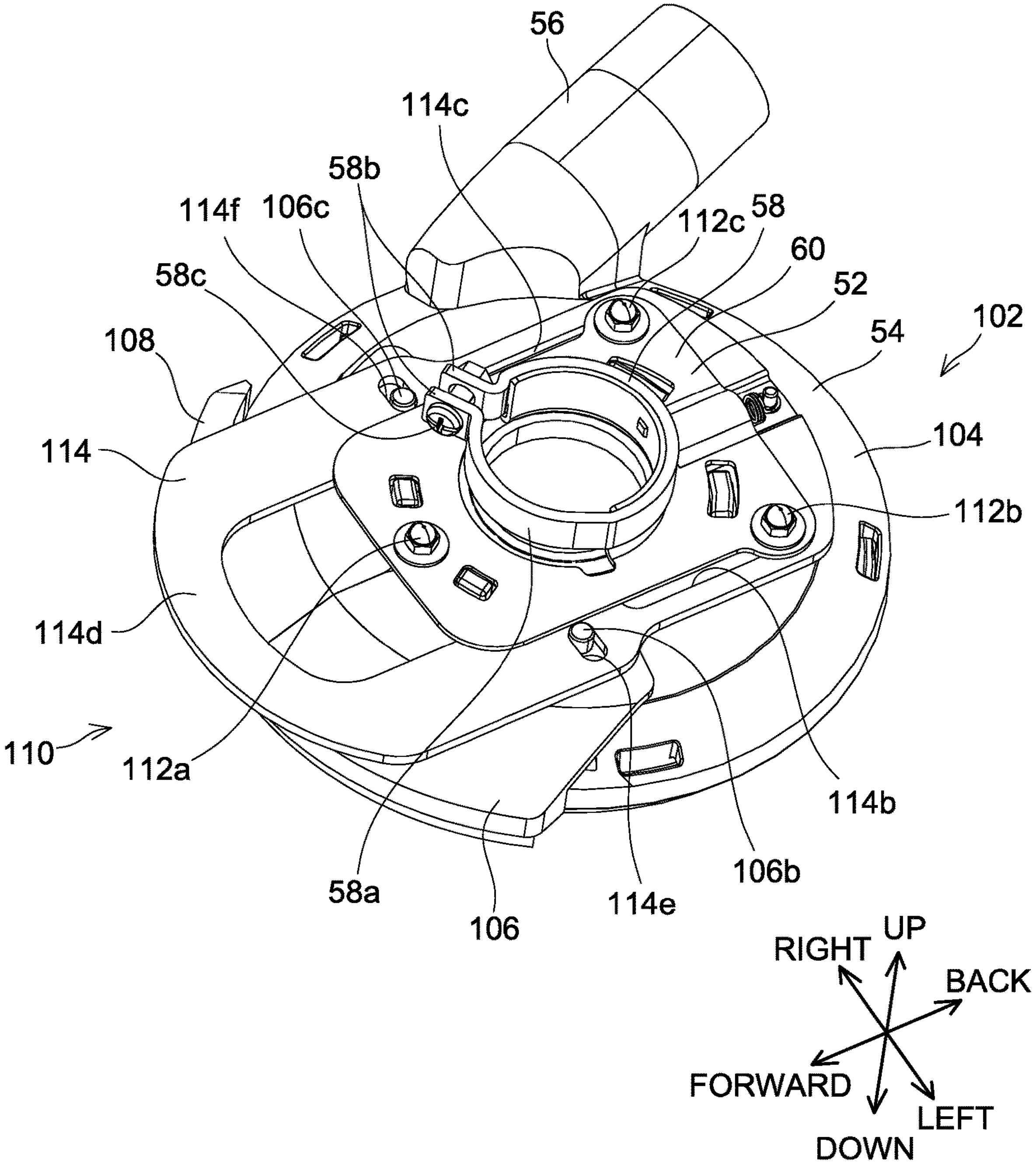
FIG. 12 is a perspective view of a dust collector cover 102 of a second embodiment, when viewed from front, left, and above.
Figure 13:
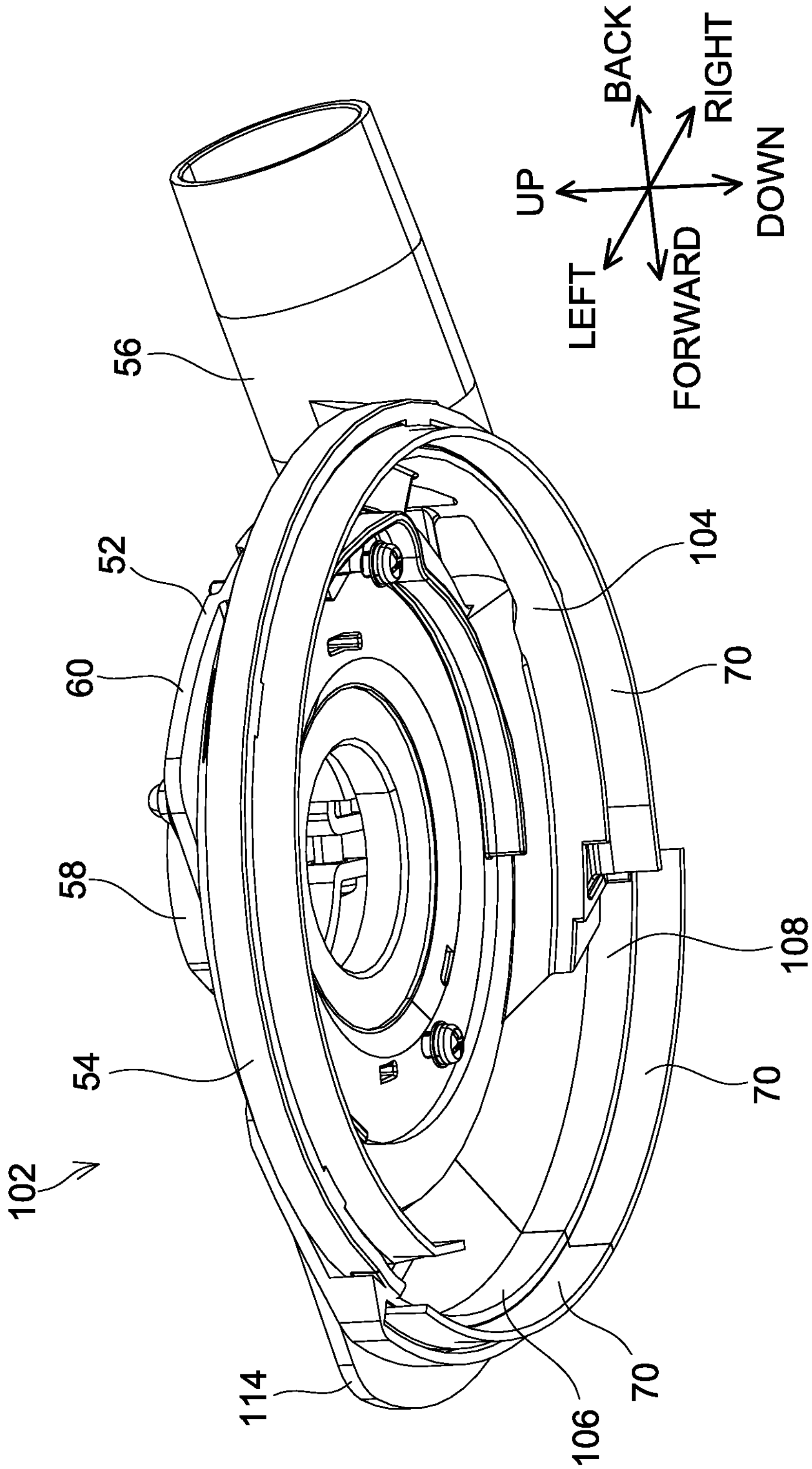
FIG. 13 is a perspective view of the dust collector cover 102 of the second embodiment, when viewed from rear, left, and below.

As shown in FIGS. 12 and 13, in the dust collector cover 102 of the present embodiment, the cover body 54 includes a fixed cover portion 104, a first movable cover portion 106, a second movable cover portion 108, and a cover opening/closing mechanism 110. The fixed cover portion 104 is disposed below the base 52. The fixed cover portion 104 is fixed to the base plate 60 of the base 52 via fasteners **112*a*, 112*b*, 112*c*. The nozzle 56 is formed integrally with the fixed cover portion 104. The nozzle 56 has the internal space communicating with an inner space of the fixed cover portion 104**.

The first movable cover portion 106 and the second movable cover portion 108 are disposed forward of the fixed cover portion 104. The fixed cover portion 104, the first movable cover portion 106, and the second movable cover portion 108 are formed to have a dish shape when combined with one another. The dust collector brush 70 (see FIG. 13) is provided below an outer edge of the fixed cover portion 104, an outer edge of the first movable cover portion 106, and an outer edge of the second movable cover portion 108. When a work is ground with the grinder 4, the fixed cover portion 104, the first movable cover portion 106, the second movable cover portion 108, and the dust collector brush 70 cover the diamond cup 6.

Figure 14:
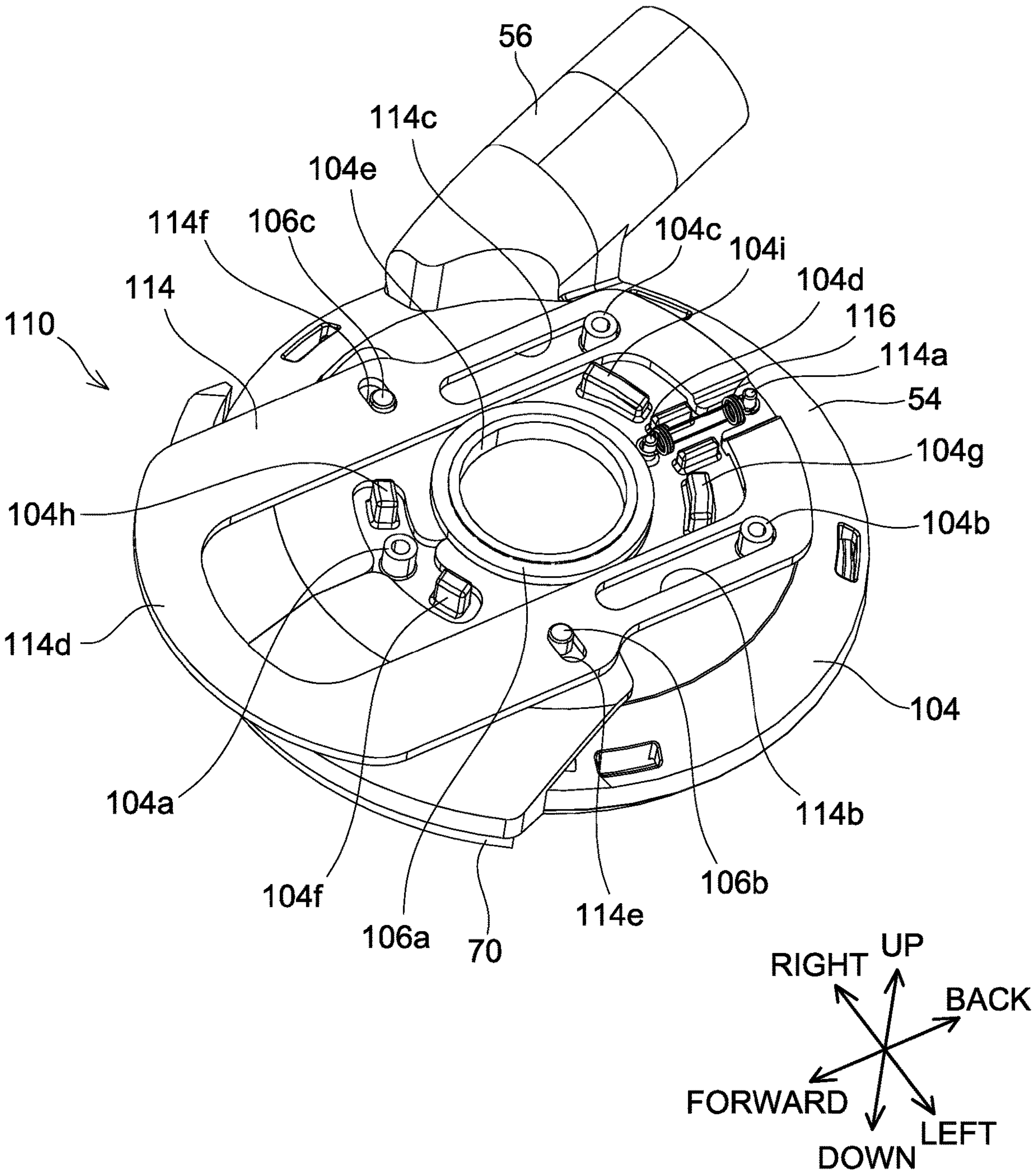
FIG. 14 is a perspective view of the dust collector cover 102 of the second embodiment, with the base 52 detached therefrom.

As shown in FIG. 14, the cover opening/closing mechanism 110 includes an operation member 114 and an elastic member 116. The operation member 114 is a member having a substantially flat plate frame shape, and having a substantially rectangular shape in plan view from above. The operation member 114 includes a protrusion 114*a* provided on an upper surface at the center of a rear portion, long holes 114*b*, 114*c* each having a longitudinal direction along the front-rear direction, a contact portion 114*d* provided at a front end of the operation member 114, and cam grooves 114*e*, 114*f* that are long holes each having a longitudinal direction along the right-left direction. Bosses 104*a*, 104*b*, 104*c* that receive the fasteners 112*a*, 112*b*, 112*c* are formed on an upper surface of the fixed cover portion 104. With the operation member 114 attached to the fixed cover portion 104, the boss 104*b* of the fixed cover portion 104 penetrates the long hole 114*b* in the operation member 114, and the boss 104*c* of the fixed cover portion 104 penetrates the long hole 114*c* in the operation member 114. The boss 104*b* is slidable inside the long hole 114*b* in the front-rear direction, and the boss 104*c* is slidable inside the long hole 114*c* in the front-rear direction. The operation member 114 is thereby supported movably in the front-rear direction with respect to the fixed cover portion 104.

A protrusion 104*d* is formed on the upper surface of the fixed cover portion 104. The elastic member 116 is an extension spring, for example, and connects the protrusion 104*d* of the fixed cover portion 104 and the protrusion 114*a* of the operation member 114. The elastic member 116 biases the operation member 114 forward with respect to the fixed cover portion 104.

Figure 15:
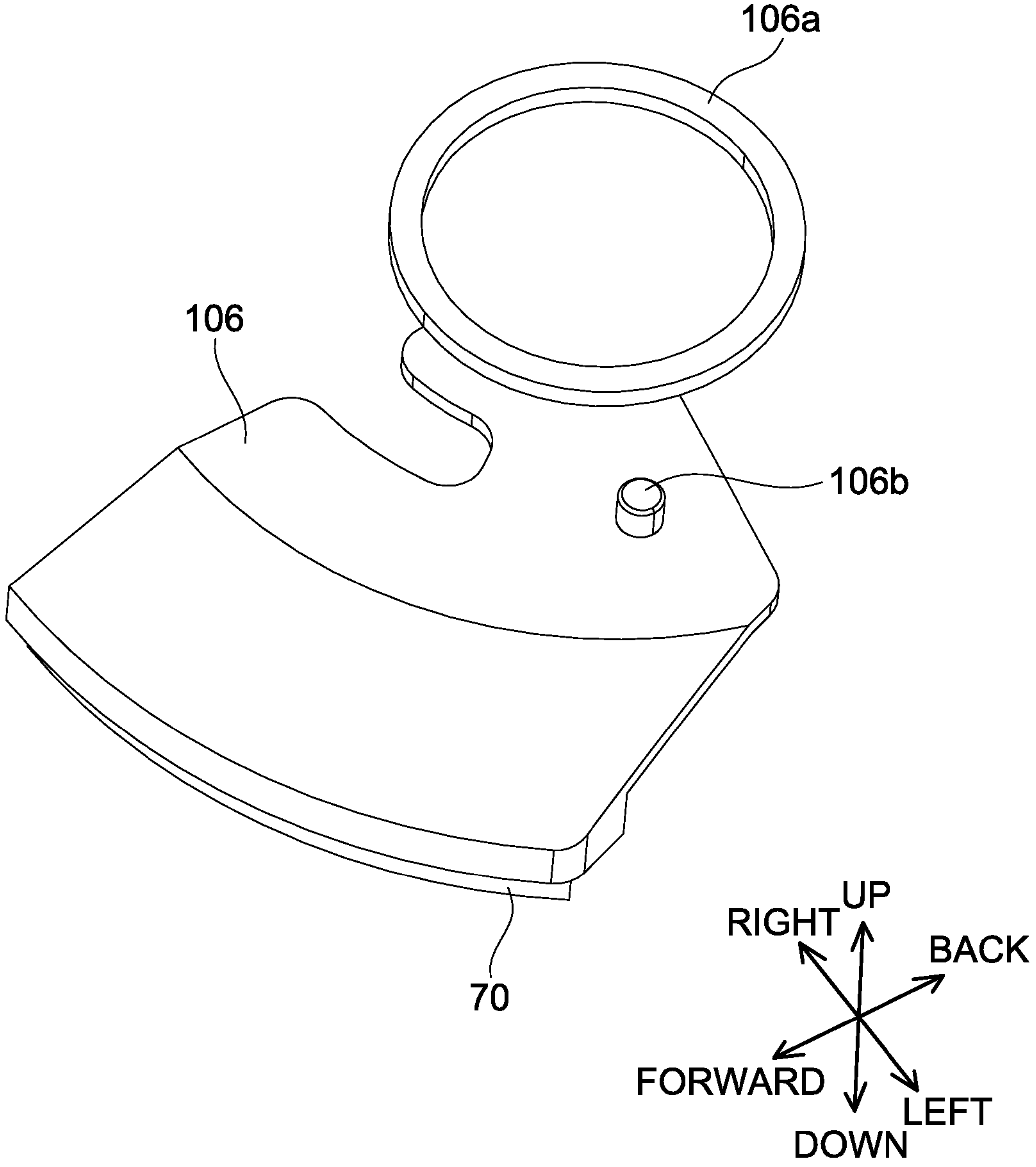
FIG. 15 is a perspective view of a first movable cover portion 106 of the dust collector cover 102 of the second embodiment.
Figure 16:
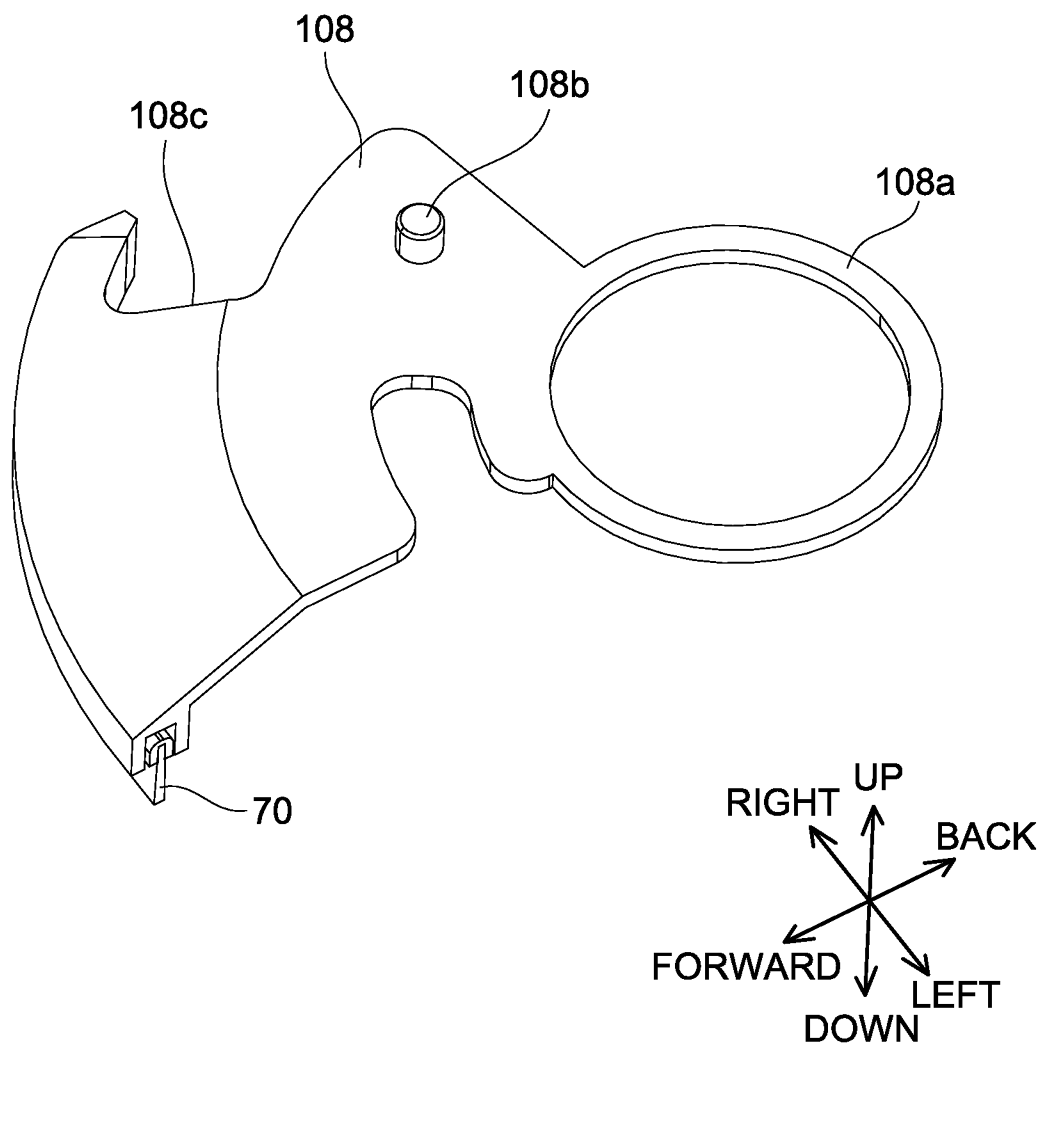
FIG. 16 is a perspective view of a second movable cover portion 108 of the dust collector cover 102 of the second embodiment.

As shown in FIG. 15, the first movable cover portion 106 includes an annular portion 106*a* formed substantially annularly, and a cam protrusion 106*b* formed on an upper surface of the first movable cover portion 106. As shown in FIG. 16, the second movable cover portion 108 includes an annular portion 108*a* formed substantially annularly, and a cam protrusion 108*b* formed on an upper surface of the second movable cover portion 108. As shown in FIG. 14, a cylindrical portion 104*e* that protrudes upward and substantially cylindrically to correspond to the annular portion 106*a* of the first movable cover portion 106 and the annular portion 108*a* of the second movable cover portion 108 is formed on the upper surface of the fixed cover portion 104. The first movable cover portion 106 and the second movable cover portion 108 are attached to the fixed cover portion 104 by attaching the annular portion 108*a* of the second movable cover portion 108 to the cylindrical portion 104*e* of the fixed cover portion 104, and then attaching the annular portion 106*a* of the first movable cover portion 106 to the cylindrical portion 104*e* of the fixed cover portion 104. With the first movable cover portion 106 and the second movable cover portion 108 attached to the fixed cover portion 104, the cylindrical portion 104*e* pivotably holds the annular portion 106*a* and the annular portion 108*a*. Therefore, with the first movable cover portion 106 and the second movable cover portion 108 attached to the fixed cover portion 104, the first movable cover portion 106 and the second movable cover portion 108 are each pivotable about a pivot axis along an axial direction of the cylindrical portion 104*e* (i.e., the up-down direction) with respect to the fixed cover portion 104 within an area not interfering each other. Stoppers 104*f*, 104*g* that limit a pivot range of the first movable cover portion 106, and stoppers 104*h*, 104*i* that limit a pivot range of the second movable cover portion 108 are formed on the upper surface of the fixed cover portion 104. The first movable cover portion 106 is pivotable with respect to the fixed cover portion 104 within an area not interfering with the stoppers 104*f*, 104*g*. The second movable cover portion 108 is pivotable with respect to the fixed cover portion 104 within an area not interfering with the stoppers 104*h*, 104*i*. As shown in FIG. 16, a notch 108*c* for avoiding interference with the nozzle 56 is defined in the second movable cover portion 108.

As shown in FIG. 14, with the first movable cover portion 106, the second movable cover portion 108, and the operation member 114 attached to the fixed cover portion 104, the cam protrusion 106*b* of the first movable cover portion 106 is inserted into the cam groove 114*e* of the operation member 114, and the cam protrusion 108*b* of the second movable cover portion 108 is inserted into the cam groove 114*f* of the operation member 114. The cam protrusions 106*b*, 108*b* are slidable inside the cam grooves 114*e*, 114*f* in the right-left direction.

In a state where no external force acts on the contact portion 114*d* of the operation member 114, the operation member 114 is moved to a position forward with respect to the fixed cover portion 104 by a biasing force of the elastic member 116. In this state, the first movable cover portion 106 and the second movable cover portion 108 are closed with respect to the fixed cover portion 104. Moreover, in this state, the contact portion 114*d* of the operation member 114 is disposed at a position forward of a front end of the first movable cover portion 106 and a front end of the second movable cover portion 108.

Figure 17:
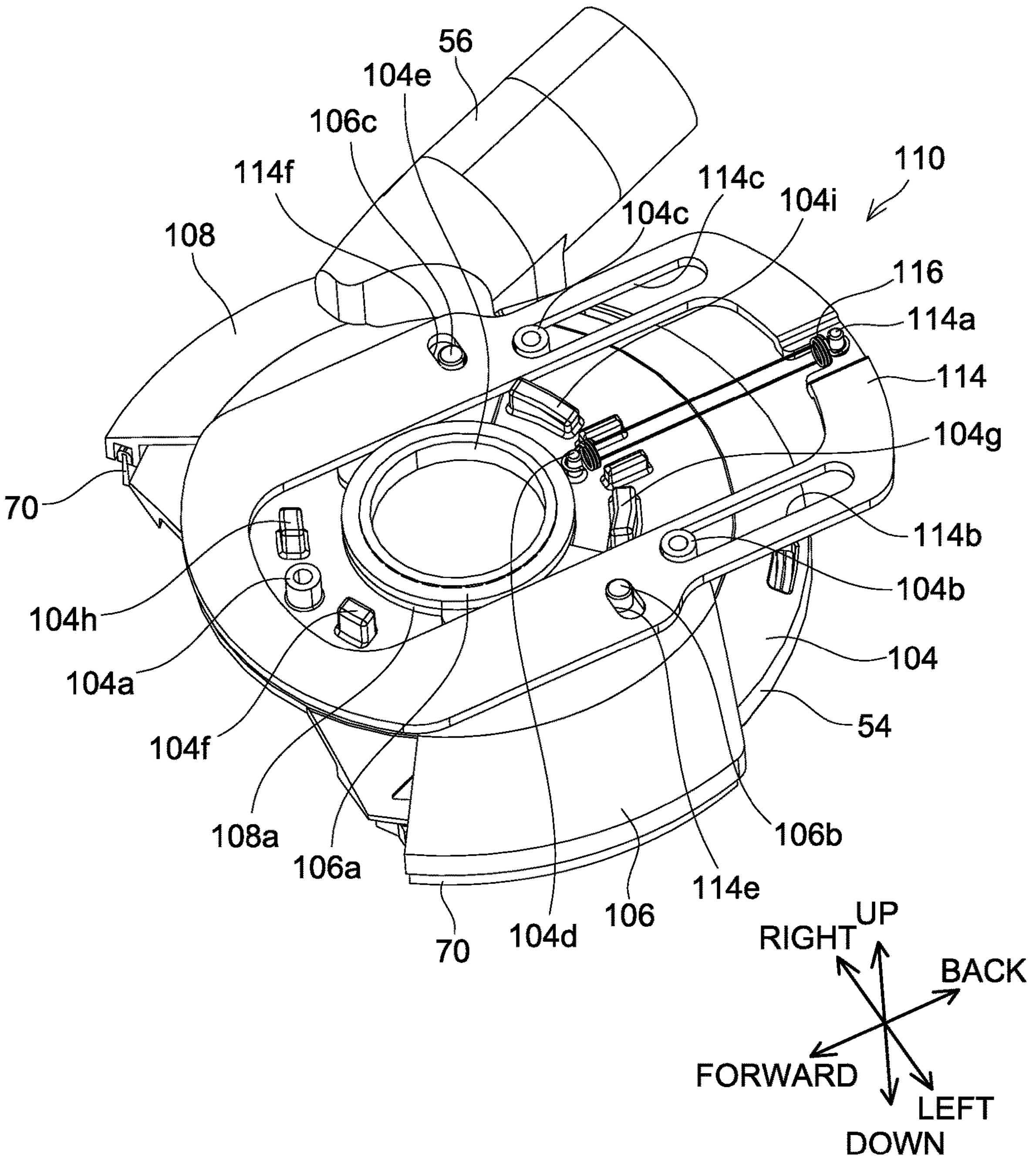
FIG. 17 is a perspective view of the dust collector cover 102 of the second embodiment, with the base 52 detached therefrom and with an operation member 114 moved rearward.

As shown in FIG. 17, when an external force acts rearward on the contact portion 114*d* of the operation member 114 and causes the operation member 114 to move to a position rearward with respect to the fixed cover portion 104 against the biasing force of the elastic member 116, the cam protrusion 106*b* of the first movable cover portion 106 and the cam protrusion 108*b* of the second movable cover portion 108 also move rearward, by which the first movable cover portion 106 and the second movable cover portion 108 each pivot in an direction opening with respect to the fixed cover portion 104. As such, in the dust collector cover 102 of the present embodiment, pushing the operation member 114 rearward against the biasing force of the elastic member 116 enables the first movable cover portion 106 and the second movable cover portion 108 each to pivot in the direction opening with respect to the fixed cover portion 104.

Figure 18:
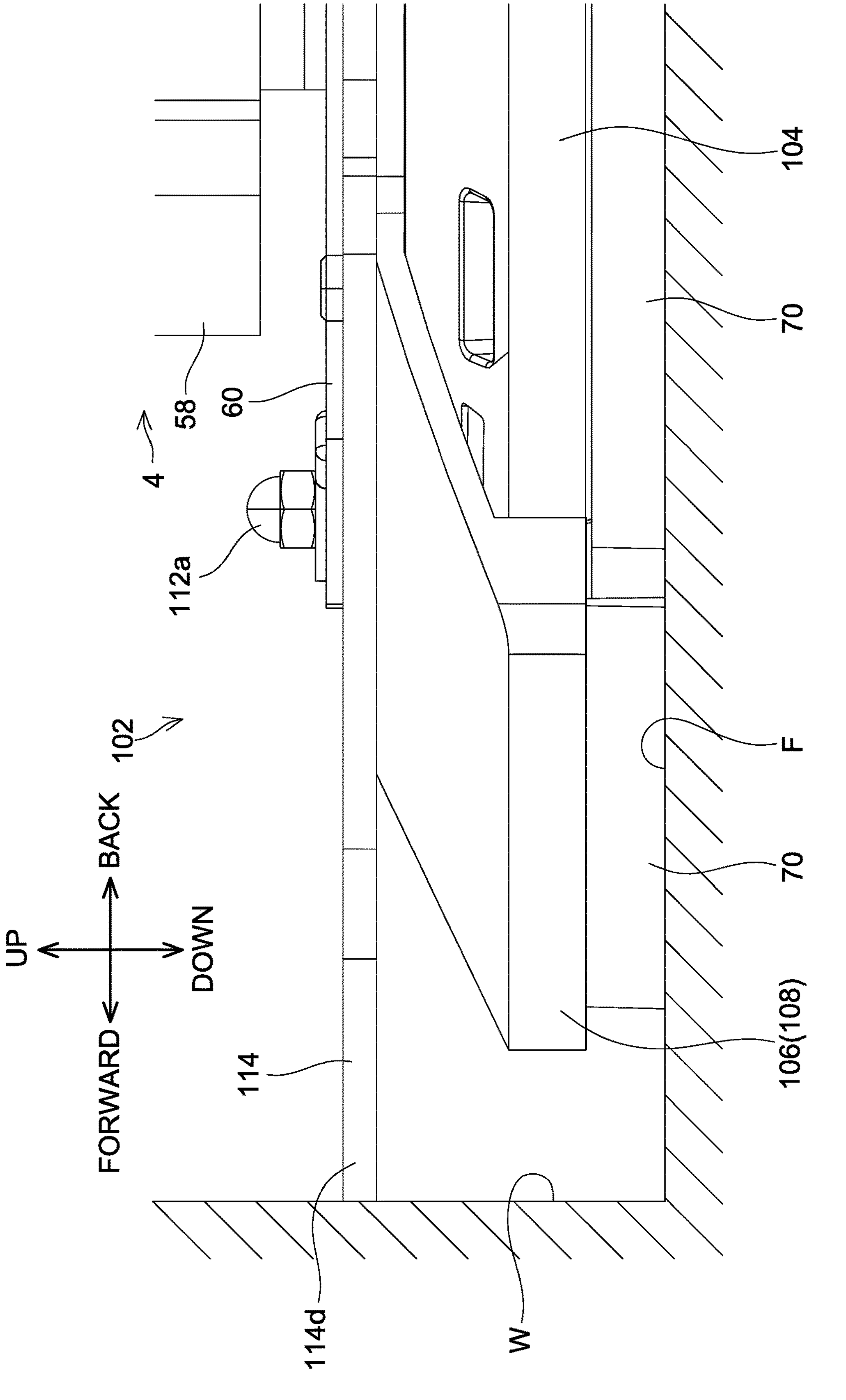
FIG. 18 is a side view of the grinder 4 to which the dust collector cover 102 of the second embodiment is attached, with the first movable cover portion 106 and the second movable cover portion 108 closed when the floor surface F near the wall surface W is ground.
Figure 19:
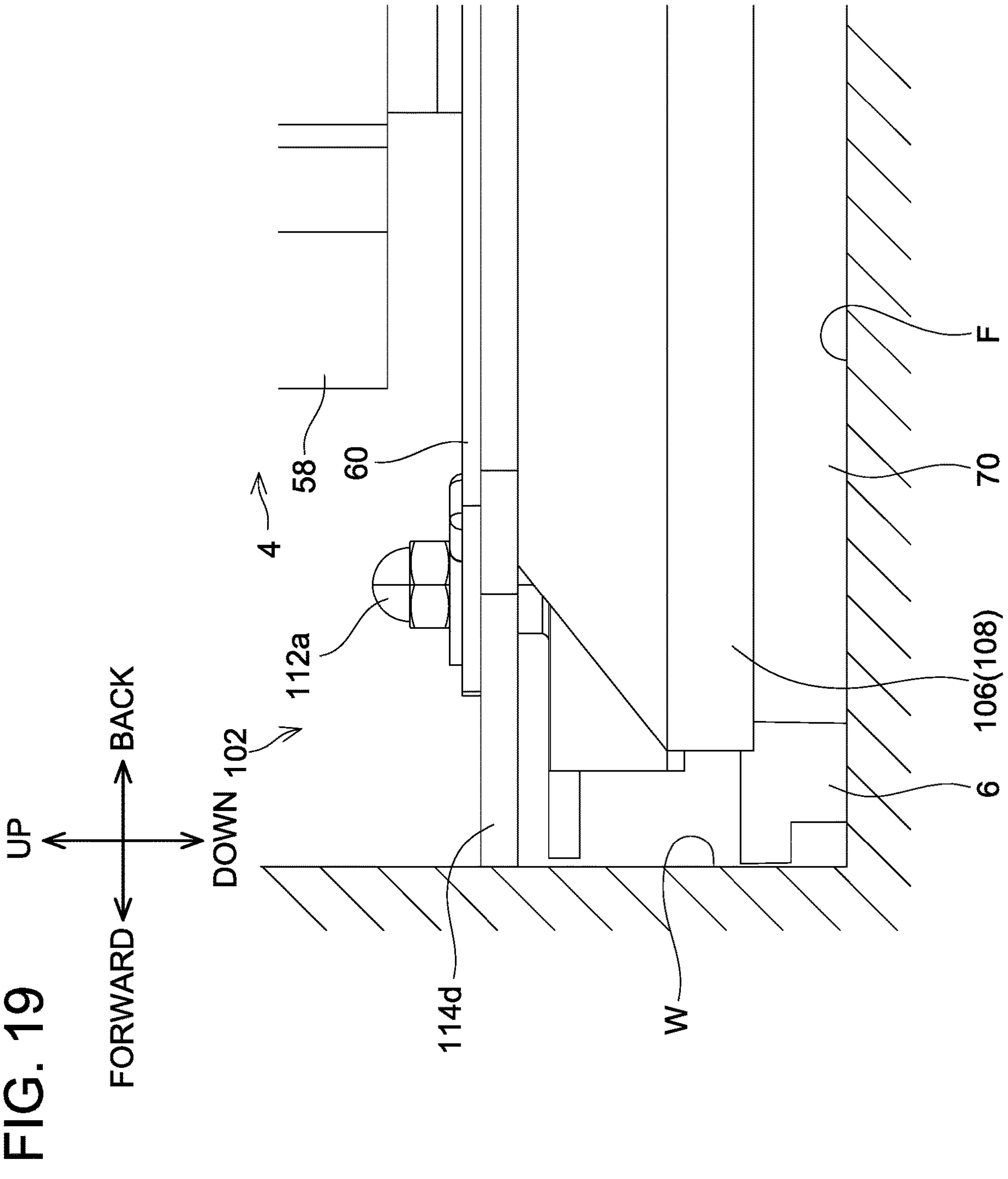
FIG. 19 is a side view of the grinder 4 to which the dust collector cover 102 of the second embodiment is attached, with the first movable cover portion 106 and the second movable cover portion 108 opened when the floor surface F near the wall surface W is ground.

As shown in FIG. 18, there may be a case where the grinder 4 is used to grind the floor surface F near the wall surface W. In such a case, in the dust collector cover 102 of the present embodiment, pushing the grinder 4 toward the wall surface W with the contact portion 114*d* of the operation member 114 contacting the wall surface W causes an external force pushing the operation member 114 rearward to act on the contact portion 114*d* from the wall surface W. As shown in FIG. 19, this enables the first movable cover portion 106 and the second movable cover portion 108 each to pivot in the direction opening with respect to the fixed cover portion 104, by which the diamond cup 6 can be exposed partially. The floor surface F near the wall surface W can be ground with the diamond cup 6. Instead of using the wall surface W, a user may grasp the contact portion 114*d* of the operation member 114 to push the contact portion 114*d* rearward, by which the first movable cover portion 106 and the second movable cover portion 108 each can pivot in the direction opening with respect to the fixed cover portion 104, by which the diamond cup 6 can be exposed partially.

As described above, in one or more embodiments, the grinder 4 (an example of a power tool) includes: the motor 14; the bevel gears 34 (an example of a power transmission mechanism) connected to the motor 14; the housing 48 that houses the motor 14 and the bevel gears 34; the spindle 32 (an example of a tip tool holder) connected to the bevel gears 34 and holding the diamond cup 6 (an example of a tip tool); and the dust collector cover 102 (an example of a cover) covering at least a part of the diamond cup 6. The dust collector cover 102 includes: the fixed cover portion 104 fixed to the housing 48; the first movable cover portion 106 and the second movable cover portion 108 (an example of a movable cover portion) movable with respect to the fixed cover portion 104; and the operation member 114 mechanically connected to the first movable cover portion 106 and the second movable cover portion 108 and configured to move the first movable cover portion 106 and the second movable cover portion 108 with respect to the fixed cover portion 104.

In one or more embodiments, the dust collector cover 102 is attached to the grinder 4 so as to cover at least a part of the diamond cup 6, the grinder 4 including the motor 14, the bevel gears 34 connected to the motor 14, the housing 48 that houses the motor 14 and the bevel gears 34, and the spindle 32 connected to the bevel gears 34 and holding the diamond cup 6. The dust collector cover 102 includes: the fixed cover portion 104 fixed to the housing 48; the first movable cover portion 106 and the second movable cover portion 108 movable with respect to the fixed cover portion 104; and the operation member 114 mechanically connected to the first movable cover portion 106 and the second movable cover portion 108 and configured to move the first movable cover portion 106 and the second movable cover portion 108 with respect to the fixed cover portion 104.

According to the grinder 4 and the dust collector cover 102 both described above, a user can move the first movable cover portion 106 and the second movable cover portion 108 with respect to the fixed cover portion 104 by operating the operation member 114 without grasping the first movable cover portion 106 and the second movable cover portion 108. Even when the first movable cover portion 106 and the second movable cover portion 108 are to be moved while the diamond cup 6 is being driven, the first movable cover port on 106 and the second movable cover portion 108 can therefore be moved without requiring the user to bring his/her hand closer to the diamond cup 6, which is being driven near the first movable cover portion 106 and the second movable cover portion 108. According to the grinder 4 and the dust collector cover 102 both described above, user safety can be improved.

In one or more embodiments, the operation member 114 includes the contact portion 114*d* configured to contact the wall surface W (an example of an obstacle) before the first movable cover portion 106, the second movable cover portion 108, and the diamond cup 6 contact the wall surface W. When the contact portion 114*d* is pushed by the wall surface W, the first movable cover portion 106 and the second movable cover portion 108 move with resect to the fixed cover portion 104 in a direction exposing the diamond cup 6.

According to the above-described configuration, when a work such as the floor surface F is processed near an obstacle such as the wall surface W, pressing the contact portion 114*d* against the obstacle enables the first movable cover portion 106 and the second movable cover portion 108 to be moved with respect to the fixed cover portion 104, by which the diamond cup 6 can be exposed. The first movable cover portion 106 and the second movable cover portion 108 can be moved with respect to the fixed cover portion 104 without a user touching the operation member 114, by which user convenience can be improved.

In one or more embodiments, the first movable cover portion 106 and the second movable cover portion 108 are configured to move with respect to the fixed cover portion 104 in a direction exposing the diamond cup 6 in response to a user manually operating the operation member 114.

According to the above-described configuration, in a case where the user seeks to expose the diamond cup 6, the user manually operates the operation member 114 to move the first movable cover portion 106 and the second movable cover portion 108 with respect to the fixed cover portion 104, by which the diamond cup 6 can be exposed.

In one or more embodiments, the dust collector cover 102 further includes the elastic member 116 (an example of a biasing member) configured to bias the operation member 114 such that the first movable cover portion 106 and the second movable cover portion 108 move with respect to the fixed cover portion 104 in a direction covering the diamond cup 6.

According to the above-described configuration, in a case where no external force acts on the operation member 114, the first movable cover portion 106 and the second movable cover portion 108 are moved with respect to the fixed cover portion 104 by a biasing force of the elastic member 116, by which the diamond cup 6 is covered. According to the above-described configuration, the diamond cup 6 is not left exposed, by which user safety can further be improved.

In one or more embodiments, the diamond cup 6 is rotatable around a rotation axis with respect to the housing 48. The operation member 114 is movable with respect to the fixed cover portion 104 along a sliding direction (e.g., the front-rear direction) substantially orthogonal to the rotation axis of the diamond cup 6.

The dust collector cover 102 covering at least a part of the diamond cup 6 has a shape expanding in a direction (the front-rear direction and the right-left direction) orthogonal to the rotation axis of the diamond cup 6. According to the above-described configuration, a direction in which the operation member 114 moves can be in a direction along an outer shape of the dust collector cover 102, by which the dust collector cover 102 can be downsized.

In one or more embodiments, the first movable cover portion 106 and the second movable cover portion 108 are each pivotable around a pivot axis (e.g., extending in the up-down direction) substantially parallel to the rotation axis of the diamond cup 6 with respect to the fixed cover portion 104.

According to the above-described configuration, when pivoted with respect to the fixed cover portion 104, the first movable cover portion 106 and the second movable cover portion 108 each move in a direction separating away from the diamond cup 6 and the work, which can prevent the first movable cover portion 106 and the second movable cover portion 108 from hindering the working process.

In one or more embodiments, one of the operation member 114, and the first movable cover portion 106 and the second movable cover portion 108 (e.g., the operation member 114) includes the cam grooves 114*e*, 114*f*. The other one of the operation member 114, and the first movable cover portion 106 and the second movable cover portion 108 (e.g., the first movable cover portion 106 and the second movable cover portion 108) includes the cam protrusions 106*b*, 108*b* slidable inside the cam grooves 114*e*, 114*f*. When the operation member 114 is moved with respect to the fixed cover portion 104 in the sliding direction, the first movable cover portion 106 and the second movable cover portion 108 each pivot around the pivot axis.

According to the above-described configuration, the pivot of the first movable cover portion 106 and the second movable cover portion 108 in conjunction with the movement of the operation member 114 can be realized with a simple configuration.

Third Embodiment

A dust collector cover 202 of the present embodiment, like the dust collector cover 2 of the first embodiment, is attached to the grinder 4 when in use. For the dust collector cover 202 of the present embodiment, only the differences between the dust collector cover 202 and the dust collector cover 2 of the first embodiment will hereinafter be described in detail.

Figure 20:
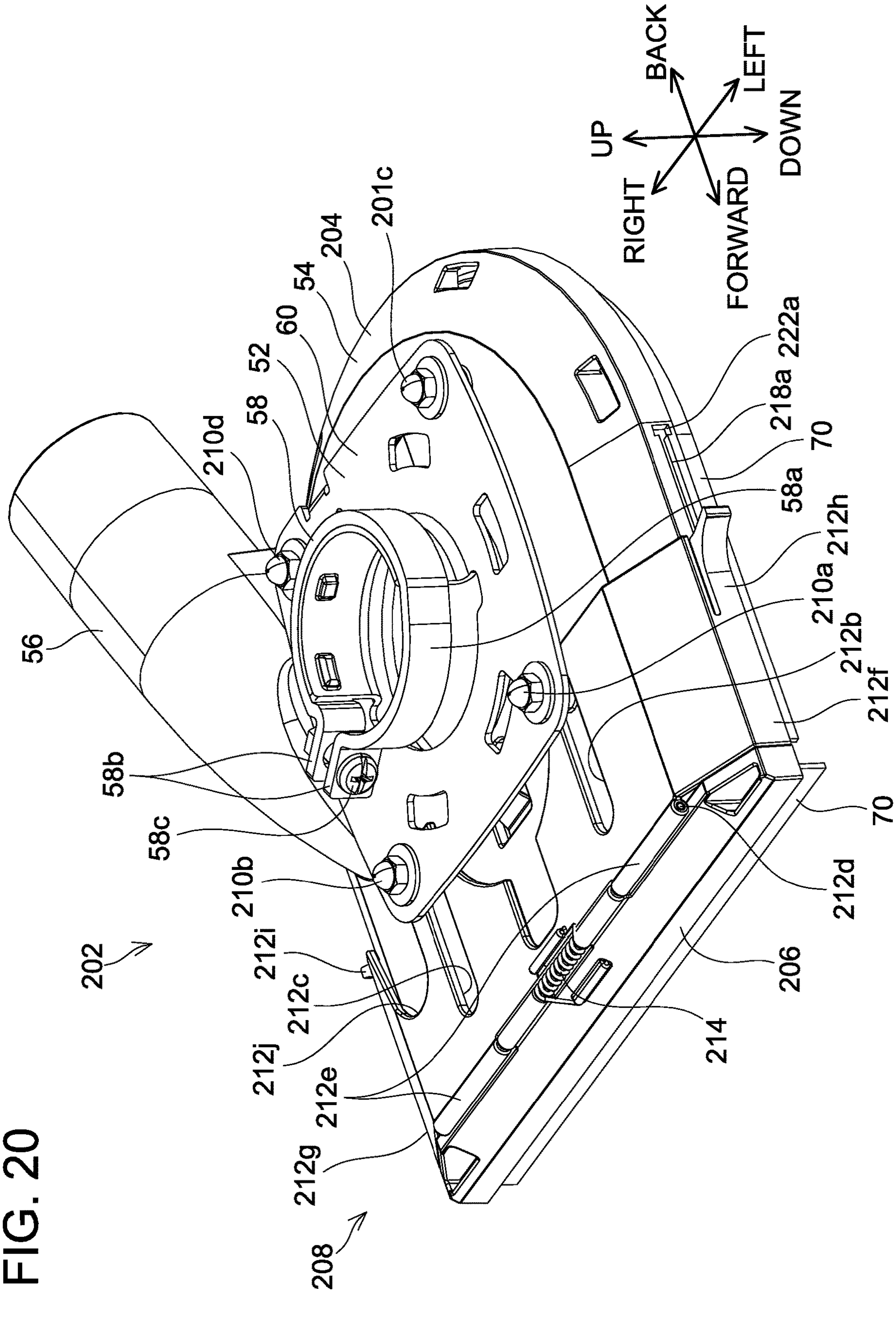
FIG. 20 is a perspective view of a dust collector cover 202 of a third embodiment, when viewed from front, left, and above.
Figure 21:
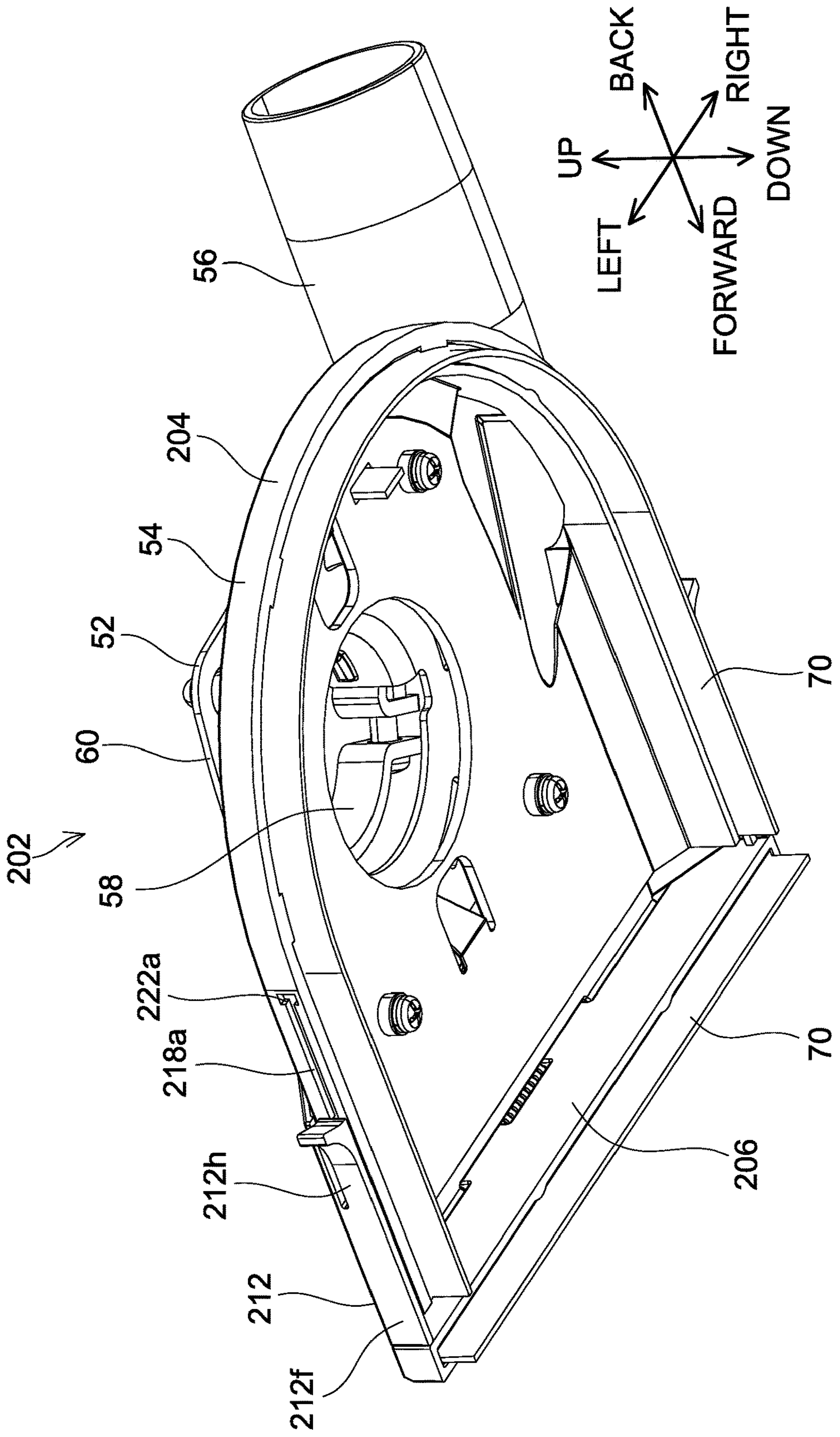
FIG. 21 is a perspective view of the dust collector cover 202 of the third embodiment, when viewed from rear, left, and below.

As shown in FIGS. 20 and 21, in the dust collector cover 202 of the present embodiment, the cover body 54 includes a fixed cover portion 204, a movable cover portion 206, and a cover opening/closing mechanism 208. The fixed cover portion 204 is disposed below the base 52. The fixed cover portion 204 is fixed to the base plate 60 of the base 52 via fasteners 210*a*, 210*b*, 210*c*, 210*d*. The nozzle 56 is formed integrally with the fixed cover portion 204. The nozzle 56 has the internal space communicating with an inner space of the fixed cover portion 204.

The movable cover portion 206 is disposed forward of the fixed cover portion 204. The fixed cover portion 204, an outer edge of which is substantially U-shaped in plan view from below, has a box-like shape with its lower portion and front portion opened. The movable cover portion 206 has a lid shape like a substantially flat plate which closes a front opening of the fixed cover portion 204. The dust collector brush 70 (see FIG. 21) is provided below the outer edge of the fixed cover portion 204 and below the movable cover portion 206. When a work is ground with the grinder 4, the fixed cover portion 204, the movable cover portion 206, and the dust collector brush 70 cover the diamond cup 6.

Figure 22:
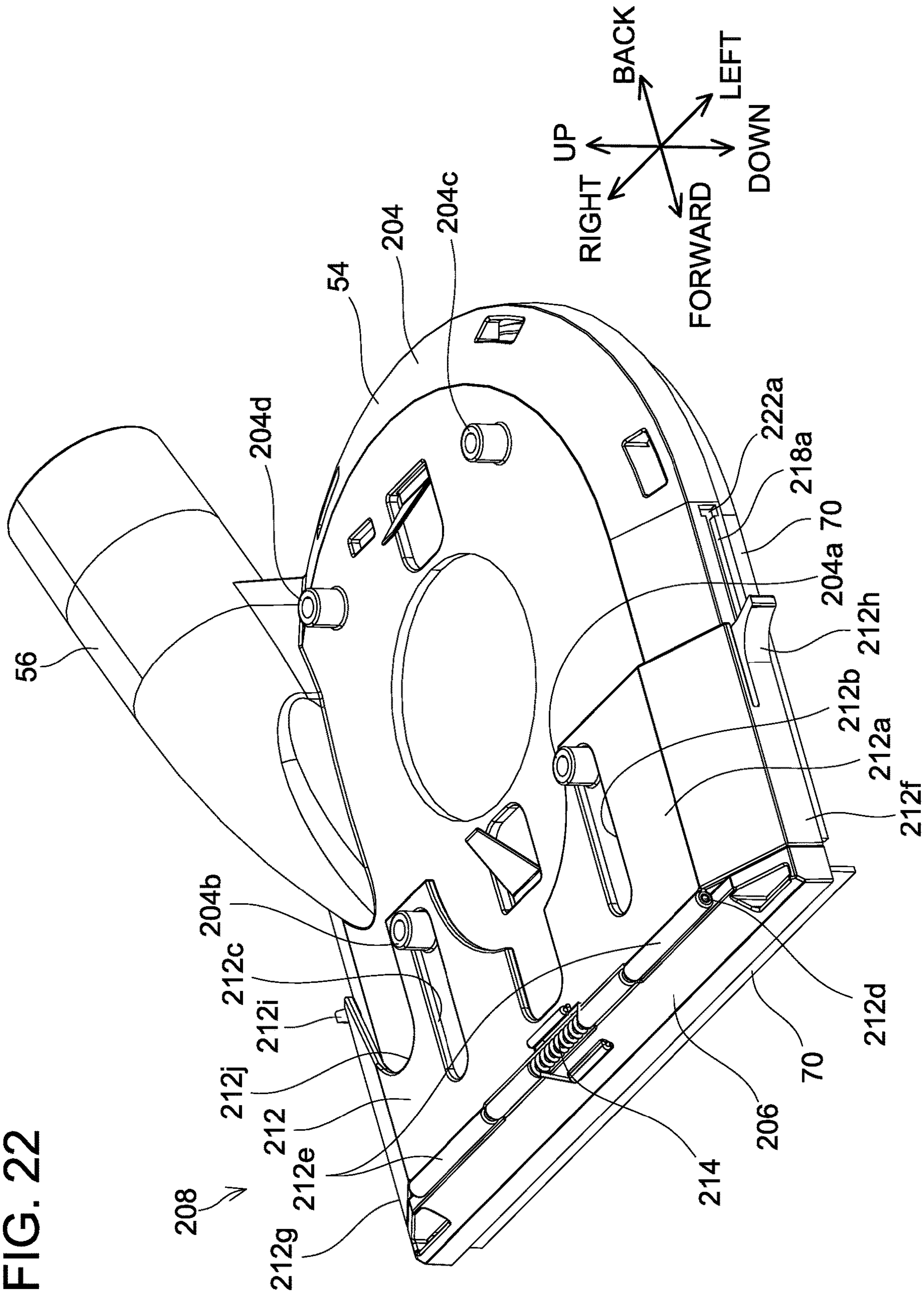
FIG. 22 is a perspective view of the dust collector cover 202 of the third embodiment, with the base 52 detached therefrom.

As shown in FIG. 22, the cover opening/closing mechanism 208 includes an operation member 212 and an elastic member 214. The operation member 212 includes a base portion 212*a* having a shape conforming to an upper front surface of the fixed cover portion 204, long holes 212*b*, 212*c* defined in the base portion 212*a* and each having a longitudinal direction along the front-rear direction, a pivot shaft 212*d* having a longitudinal direction along the right-left direction, a holding portion 212*e* connected to an upper end of the movable cover portion 206 via the pivot shaft 212*d*, side wall portions 212*f*, 212*g* extending outside end surfaces of the fixed cover portion 204 in the right-left direction, and arm portions 212*h*, 212*i* extending rearward from the side wall portions 212*f*, 212*g*.

Figure 23:
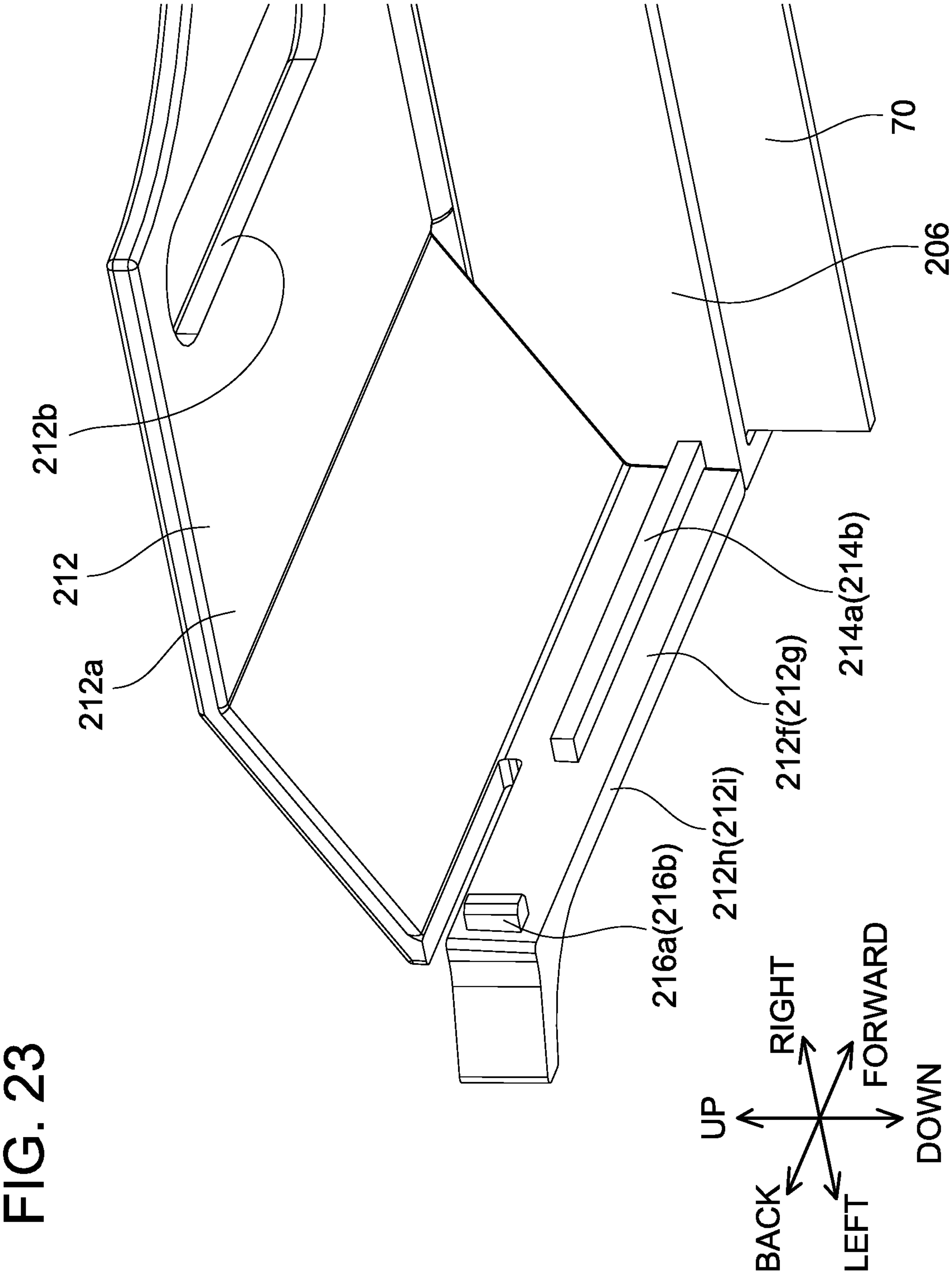
FIG. 23 is a perspective view of an inside of an operation member 212 in the dust collector cover 202 of the third embodiment, when viewed from rear, right, and below.

As shown in FIG. 23, a guide protrusion 214*a* having a longitudinal direction along the front-rear direction is provided on an inside of the side wall portion 212*f*. Moreover, an engagement protrusion 216*a* having a longitudinal direction along the up-down direction is provided on an inside of the arm portion 212*h* extending from the side wall portion 212*f*. The side wall portion 212*f* and the arm portion 212*h*, and the side wall portion 212*g* and the arm portion 212*i*, have shapes laterally symmetric with respect to the center of the dust collector cover 202. In other words, a guide protrusion 214*b* having a longitudinal direction along the front-rear direction is provided on an inside of the side wall portion 212*g*. Moreover, an engagement protrusion 216*b* having a longitudinal direction along the up-down direction is provided on an inside of the arm portion 212*i* extending from the side wall portion 212*g*.

Figure 24:
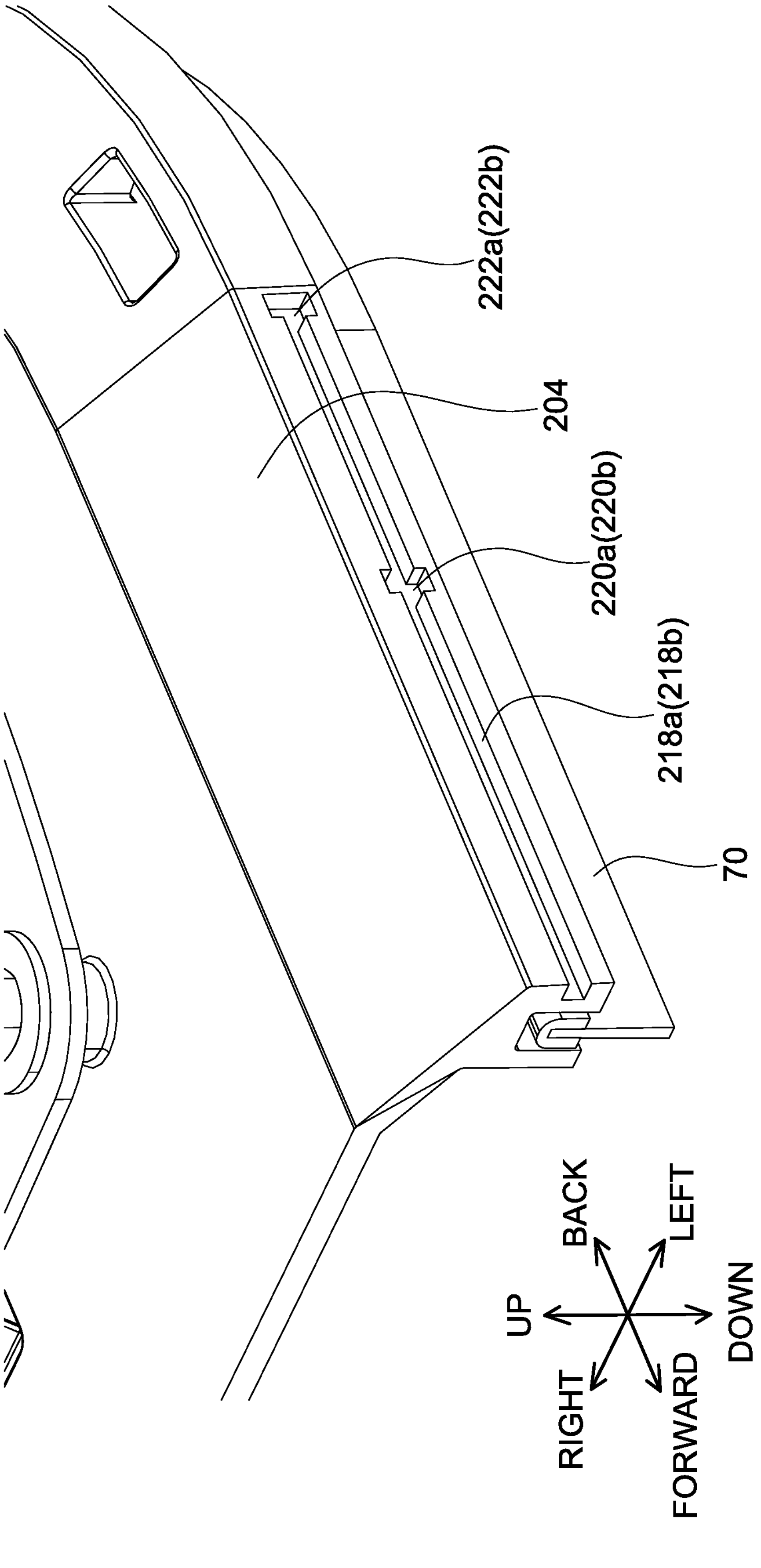
FIG. 24 is a perspective view of a left front end of a fixed cover portion 204 in the dust collector cover 202 of the third embodiment, when viewed from front, left, and above.

As shown in FIG. 24, a guide groove 218*a* having a longitudinal direction along the front-rear direction and corresponding to the guide protrusion 214*a* is defined in the left end surface of the fixed cover portion 204. Moreover, a first engagement groove 220*a* and a second engagement groove 222*a* each having a longitudinal direction along the up-down direction and corresponding to the engagement protrusion 216*a* are defined in the left end surface of the fixed cover portion 204. The first engagement groove 220*a* is disposed at a position forward of the second engagement groove 222*a*. Similarly, a guide groove 218*b* having a longitudinal direction along the front-rear direction and corresponding to the guide protrusion 214*b* is defined in the right end surface of the fixed cover portion 204. Moreover, a first engagement groove 220*b* and a second engagement groove 222*b* each having a longitudinal direction along the up-down direction and corresponding to the engagement protrusion 216*b* are defined in the right end surface of the fixed cover portion 204. The first engagement groove 220*b* is disposed at a position forward of the second engagement groove 222*b*.

As shown in FIG. 22, bosses 204*a*, 204*b*, 204*c*, 204*d* that receive the fasteners 210*a*, 210*b*, 210*c*, 210*d* are formed on an upper surface of the fixed cover portion 204. With the operation member 212 attached to the fixed cover portion 204, the boss 204*a* of the fixed cover portion 204 penetrates the long hole 212*b* in the operation member 212, and the boss 204*b* of the fixed cover portion 204 penetrates the long hole 212*c* in the operation member 212. The boss 204*a* is slidable inside the long hole 212*b* in the front-rear direction, and the boss 204*b* is slidable inside the long hole 212*c* in the front-rear direction. Moreover, with the operation member 212 attached to the fixed cover portion 204, the guide protrusion 214*a* (see FIG. 23) of the operation member 212 is inserted into the guide groove 218*a* (see FIG. 24) in the fixed cover portion 204, and the guide protrusion 214*b* of the operation member 212 is inserted into the guide groove 218*b* in the fixed cover portion 204. The guide protrusion 214*a* is slidable inside the guide groove 218*a* in the front-rear direction, and the guide protrusion 214*b* is slidable inside the guide groove 218*b* in the front-rear direction. The operation member 212 is thereby supported movably in the front-rear direction with respect to the fixed cover portion 204.

With the operation member 212 attached to the fixed cover portion 204, by engaging the protrusions 216*a*, 216*b* (see FIG. 23) of the operation member 212 with the first engagement grooves 220*a*, 220*b* (see FIG. 24) or the second engagement grooves 222*a*, 222*b* (see FIG. 24) in the fixed cover portion 204, the operation member 212 can be fixed to the fixed cover portion 204. In the following, the position of the operation member 212 when the engagement protrusions 216*a*, 216*b* of the operation member 212 are engaged with the first engagement grooves 220*a*, 220*b* in the fixed cover portion 204 will be termed an advancing position, and the position of the operation member 212 when the engagement protrusions 216*a*, 216*b* of the operation member 212 are engaged with the second engagement grooves 222*a*, 222*b* in the fixed cover portion 204 will be termed a receding position. The operation member 212 has a notch 212*j* defined therein so as not to interfere with the nozzle 56 when moving to the receding position.

As shown in FIG. 20, the elastic member 214 is a torsion spring, for example, and biases the movable cover portion 206 in a direction closing with respect to the operation member 212. In a case where the operation member 212 is at the advancing position, the movable cover portion 206 is closed with respect to the fixed cover portion 204 by a biasing force of the elastic member 214.

Figure 25:
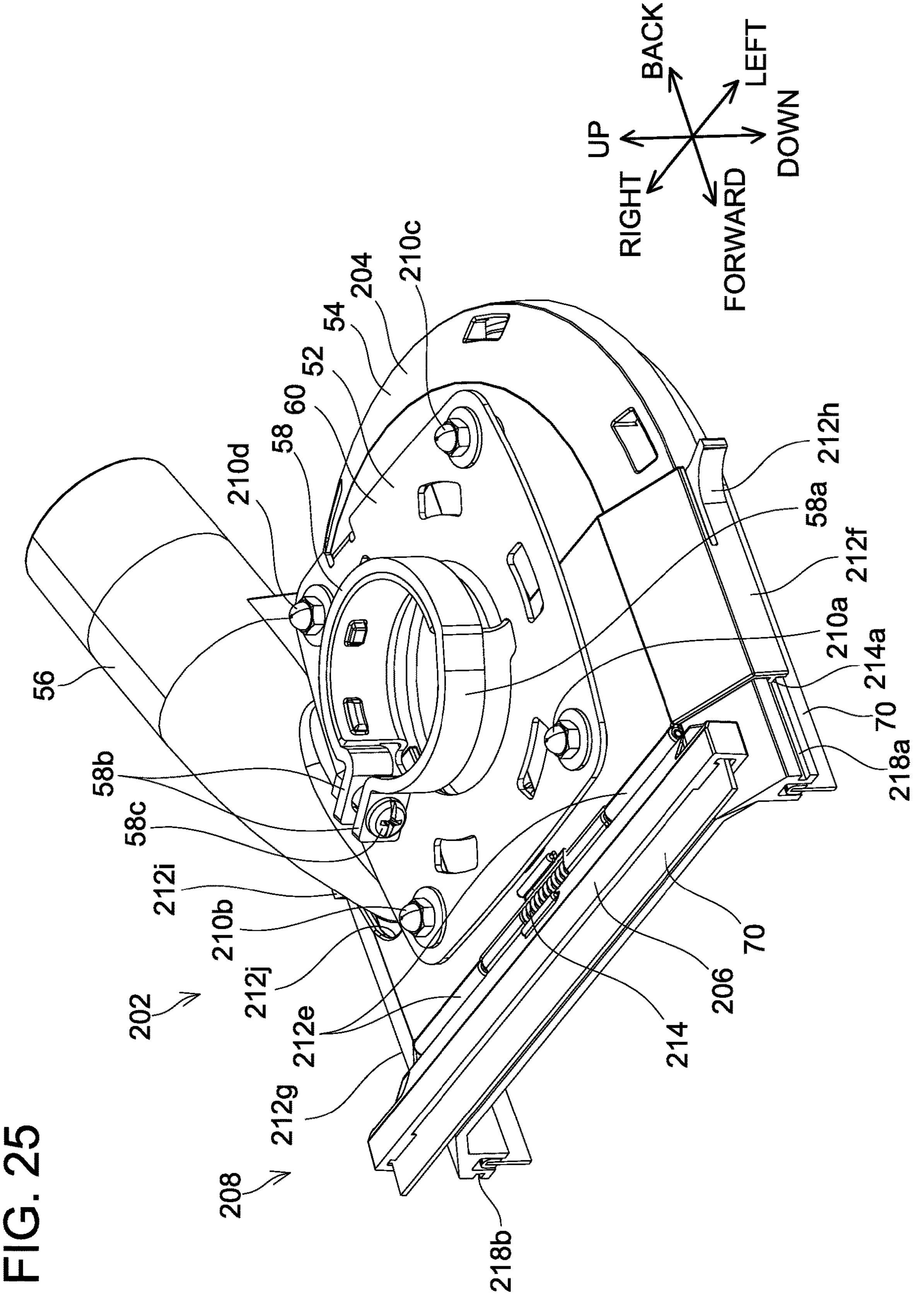
FIG. 25 is a perspective view of the dust collector cover 202 of the third embodiment, with a movable cover portion 206 opened, when viewed from front, left, and above.

From this state, when the engagement protrusions 216*a*, 216*b* of the operation member 212 are separated from the first engagement grooves 220*a*, 220*b* in the fixed cover portion 204 and the operation member 212 is moved rearward with respect to the fixed cover portion 204, the upper end of the movable cover portion 206 and the operation member 212 integrally move rearward. A rear end surface of the movable cover portion 206 contacts a front end surface of the fixed cover portion 204, and the movable cover portion 206 moves onto the upper surface of the fixed cover portion 204 while pivoting in a direction opening about an axial direction of the pivot shaft 212*d* located thereabove. As shown in FIG. 25, when the operation member 212 is moved to the receding position, and the engagement protrusions 216*a*, 216*b* of the operation member 212 are engaged with the second engagement grooves 222*a*, 222*b* in the fixed cover portion 204, the movable cover portion 206 is brought into a completely opened state.

Figure 26:
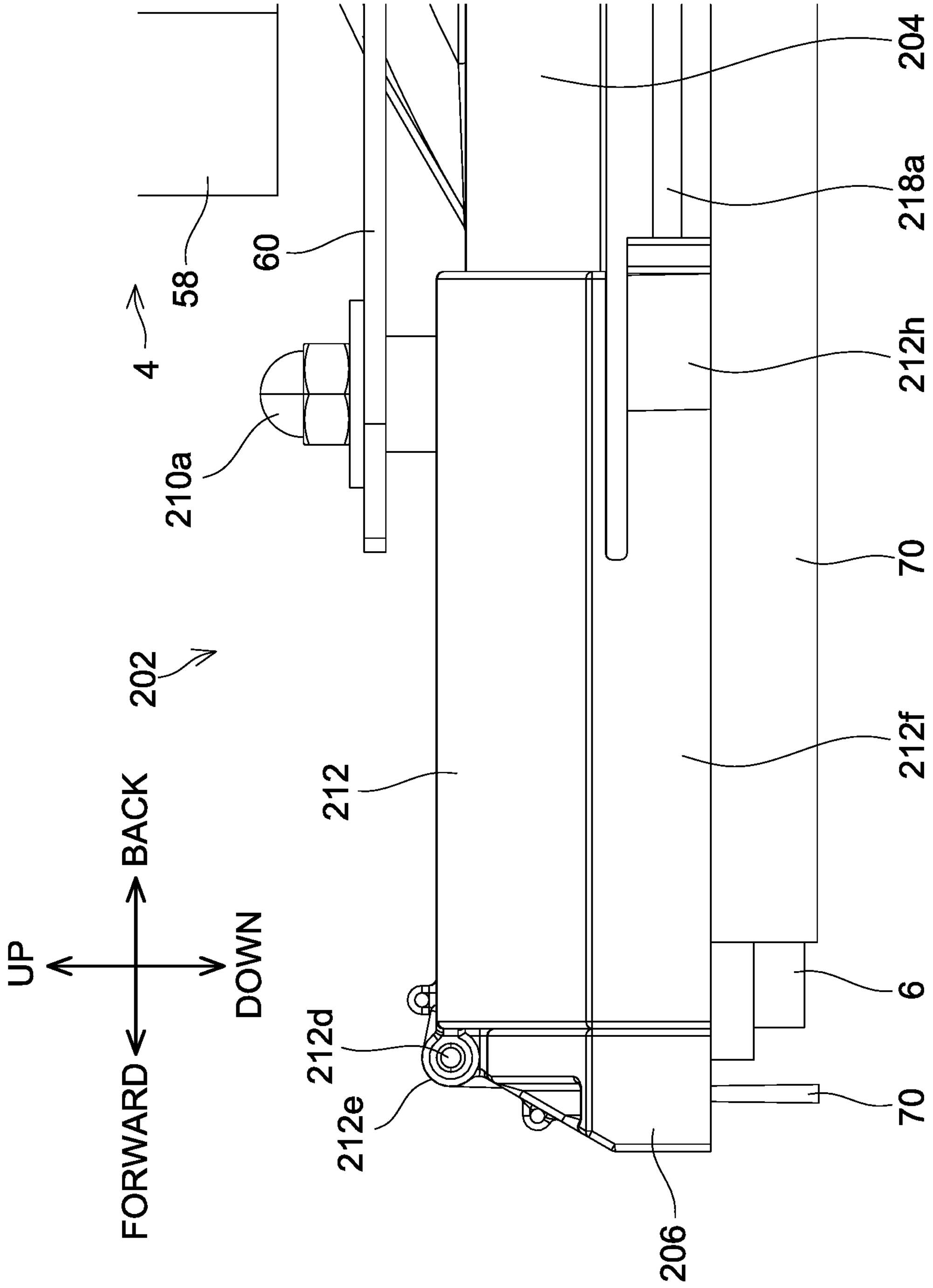
FIG. 26 is a side view of the grinder 4 to which the dust collector cover 202 of the third embodiment is attached, with the movable cover portion 206 closed.
Figure 27:
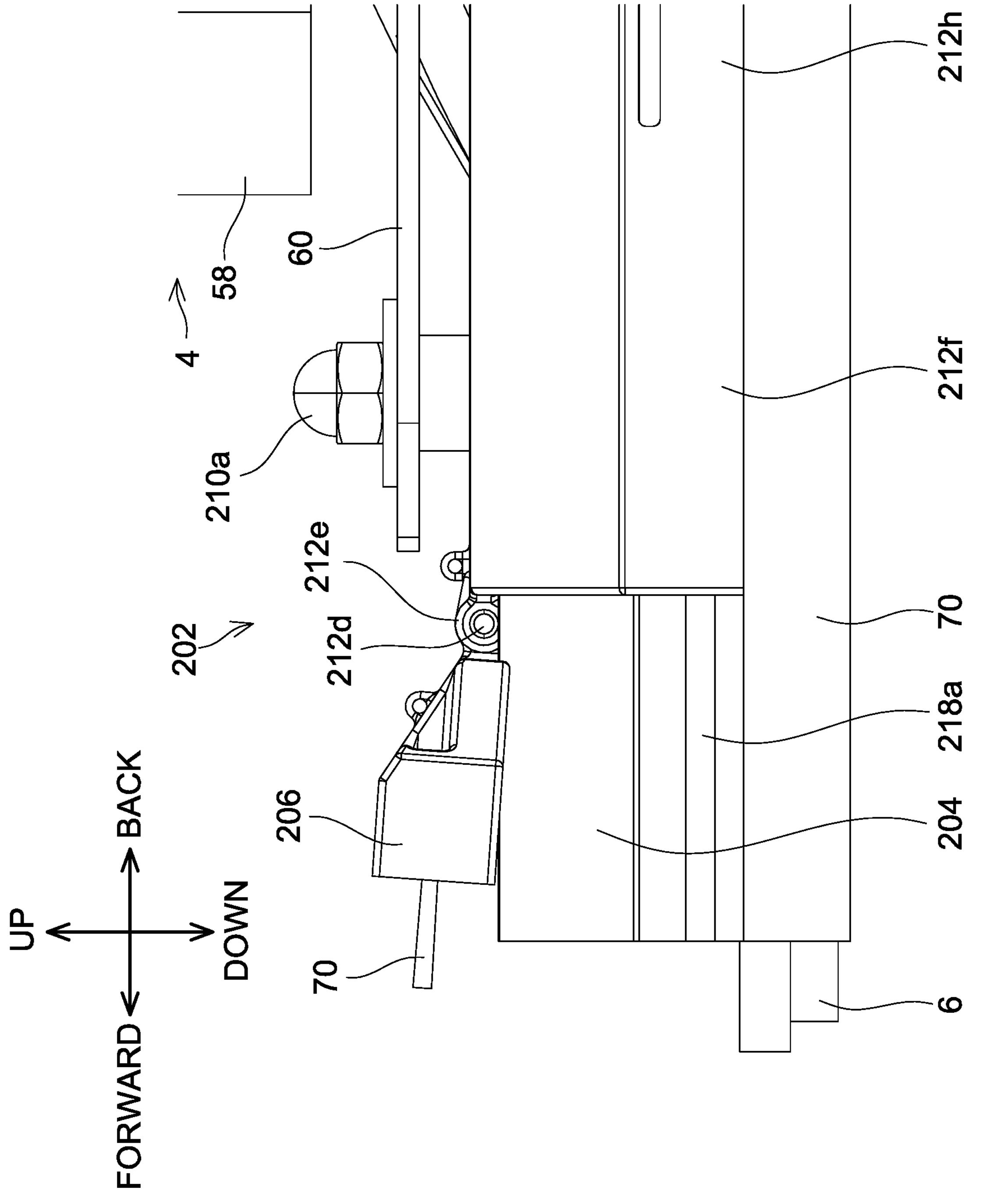
FIG. 27 is a side view of the grinder 4 to which the dust collector cover 202 of the third embodiment is attached, with the movable cover portion 206 opened.

As shown in FIG. 26, in a case where the operation member 212 is at the advancing position, the diamond cup 6 is covered with the dust collector cover 202. In contrast to this, as shown in FIG. 27, in a case where the operation member 212 is at the receding position, the diamond cup 6 is partially exposed from the dust collector cover 202.

As described above, in one or more embodiments, the grinder 4 (an example of a power tool) includes: the motor 14; the bevel gears 34 (an example of a power transmission mechanism) connected to the motor 14; the housing 48 that houses the motor 14 and the bevel gears 34; the spindle 32 (an example of a tip tool holder) connected to the bevel gears 34 and holding the diamond cup 6 (an example of a tip tool); and the dust collector cover 202 (an example of a cover) covering at least a part of the diamond cup 6. The dust collector cover 202 includes: the fixed cover portion 204 fixed to the housing 48; the movable cover portion 206 movable with respect to the fixed cover portion 204; and the operation member 212 mechanically connected to the movable cover portion 206 and configured to move the movable cover portion 206 with respect to the fixed cover portion 204.

In one or more embodiments, the dust collector cover 202 is attached to the grinder 4 so as to cover at least a part of the diamond cup 6, the grinder 4 including the motor 14, the bevel gears 34 connected to the motor 14, the housing 48 that houses the motor 14 and the bevel gears 34, and the spindle 32 connected to the bevel gears 34 and holding the diamond cup 6. The dust collector cover 202 includes: the fixed cover portion 204 fixed to the housing 48; the movable cover portion 206 movable with respect to the fixed cover portion 204; and the operation member 212 mechanically connected to the movable cover portion 206 and configured to move the movable cover portion 206 with respect to the fixed cover portion 204.

According to the grinder 4 and the dust collector cover 202 both described above, a user can move the movable cover portion 206 with respect to the fixed cover portion 204 by operating the operation member 212 without grasping the movable cover portion 206. Even when the movable cover portion 206 is to be moved while the diamond cup 6 is being driven, the movable cover portion 206 can therefore be moved without requiring the user to bring his/her hand closer to the diamond cup 6, which is being driven near the movable cover portion 206. According to the grinder 4 and the dust collector cover 202 both described above, user safety can be improved.

In one or more embodiments, the movable cover portion 206 is configured to move with respect to the fixed cover portion 204 in a direction exposing the diamond cup 6 in response to a user manually operating the operation member 212.

According to the above-described configuration, in a case where the user seeks to expose the diamond cup 6, the user manually operates the operation member 212 to move the movable cover portion 206 with respect to the fixed cover portion 204, by which the diamond cup 6 can be exposed.

In one or more embodiments, the diamond cup 6 is rotatable around a rotation axis with respect to the housing 48. The operation member 212 is movable with respect to the fixed cover portion 204 along a sliding direction (e.g., the front-rear direction) substantially orthogonal to the rotation axis of the diamond cup 6.

The dust collector cover 202 covering at least a part of the diamond cup 6 has a shape expanding in a direction (the front-rear direction and the right-left direction) orthogonal to the rotation axis of the diamond cup 6. According to the above-described configuration, a direction in which the operation member 212 moves can be set a direction along an outer shape of the dust collector cover 202, by which the dust collector cover 202 can be downsized.

In one or more embodiments, the movable cover portion 206 is pivotable around a pivot axis (e.g., the right-left direction) substantially orthogonal to the rotation axis of the diamond cup 6 and the sliding direction of the operation member 212 with respect to the fixed cover portion 204.

According to the above-described configuration, when pivoted with respect to the fixed cover portion 204, the movable cover portion 206 moves in a direction separating away from the diamond cup 6 and the work, which can prevent the movable cover portion 206 from hindering the working process.

In the above-described embodiments, a case where the power tool is the grinder 4, the tip tool is the diamond cup 6, the tip tool holder is the spindle 32, and the cover is any of the dust collector covers 2, 102, 202 has been described as an example. However, the power tool may be a power tool of another type, the tip tool may be a tip tool of another type, the tip tool holder may be a tip tool holder of another type, and the cover may be a cover of another type. Moreover, in the above-described embodiments, the grinder 4 configured to operate as a power tool by receiving AC electric power supplied from the power supply cord 24 has been described. In contrast to this, the grinder 4 may be configured to operate as a power tool by receiving DC electric power supplied from a battery attached to the body housing 8.

The invention claimed is:

1. A power tool comprising:

a motor;

a power transmission mechanism connected to the motor;

a housing that houses the motor and the power transmission mechanism;

a tip tool holder connected to the power transmission mechanism and holding a tip tool; and a cover covering at least a part of the tip tool, wherein the cover includes:

a fixed cover portion fixed to the housing;

a movable cover portion movable with respect to the fixed cover portion; and an operation member mechanically connected to the movable cover portion and configured to move the movable cover portion with respect to the fixed cover portion, the tip tool is rotatable around a rotation axis with respect to the housing, the operation member is movable with respect to the fixed cover portion along a sliding direction substantially orthogonal to the rotation axis, the movable cover portion is pivotable around a pivot axis substantially parallel to the rotation axis with respect to the fixed cover portion, one of the operation member and the movable cover portion includes a cam groove, the other one of the operation member and the movable cover portion includes a cam protrusion slidable inside the cam groove, and when the operation member is moved with respect to the fixed cover portion in the sliding direction, the movable cover portion pivots around the pivot axis.

2. The power tool according to claim 1, wherein the operation member includes a contact portion configured to contact an obstacle before the movable cover portion and the tip tool contact the obstacle, and when the contact portion is pushed by the obstacle, the movable cover portion moves with respect to the fixed cover portion in a direction exposing the tip tool.

3. The power tool according to claim 1, wherein the movable cover portion is configured to move with respect to the fixed cover portion in a direction exposing the tip tool in response to a user manually operating the operation member.

4. The power tool according to claim 1, wherein the cover further includes a biasing member configured to bias the operation member such that the movable cover portion moves with respect to the fixed cover portion in a direction covering the tip tool.

5. A cover attached to a power tool so as to cover at least a part of a tip tool, the power tool including a motor, a power transmission mechanism connected to the motor, a housing that houses the motor and the power transmission mechanism, and a tip tool holder connected to the power transmission mechanism and holding the tip tool, the cover comprising:

a fixed cover portion fixed to the housing;

a movable cover portion movable with respect to the fixed cover portion; and an operation member mechanically connected to the movable cover portion and configured to move the movable cover portion with respect to the fixed cover portion, wherein the tip tool is rotatable around a rotation axis with respect to the housing, the operation member is movable with respect to the fixed cover portion along a sliding direction substantially orthogonal to the rotation axis, the movable cover portion is pivotable around a pivot axis substantially parallel to the rotation axis with respect to the fixed cover portion, one of the operation member and the movable cover portion includes a cam groove, the other of the operation member and the movable cover portion includes a cam protrusion slidable inside the cam groove, and when the operation member is moved with respect to the fixed cover portion in the sliding direction, the movable cover portion pivots around the pivot axis.

6. The cover according to claim 5, wherein the operation member includes a contact portion configured to contact an obstacle before the movable cover portion and the tip tool contact the obstacle, and when the contact portion is pushed by the obstacle, the movable cover portion moves with respect to the fixed cover portion in a direction exposing the tip tool.

7. The cover according to claim 5, wherein the movable cover portion is configured to move with respect to the fixed cover portion in a direction exposing the tip tool in response to a user manually operating the operation member.

8. The cover according to claim 5, further comprising a biasing member configured to bias the operation member such that the movable cover portion moves with respect to the fixed cover portion in a direction covering the tip tool.

9. A power tool comprising:

a motor;

a power transmission mechanism connected to the motor;

a housing that houses the motor and the power transmission mechanism;

a tip tool holder connected to the power transmission mechanism and holding a tip tool; and a cover covering at least a part of the tip tool, wherein the cover includes:

a fixed cover portion fixed to the housing;

a movable cover portion movable with respect to the fixed cover portion; and an operation member mechanically connected to the movable cover portion and configured to move the movable cover portion with respect to the fixed cover portion, the tip tool is rotatable around a rotation axis with respect to the housing, the operation member is movable with respect to the fixed cover portion along a sliding direction substantially orthogonal to the rotation axis, the movable cover portion is pivotable around a pivot axis substantially orthogonal to the rotation axis and the sliding direction with respect to the fixed cover portion, one of the operation member and the movable cover portion includes a cam groove, the other one of the operation member and the movable cover portion includes a cam protrusion slidable inside the cam groove, and when the operation member is moved with respect to the fixed cover portion in the sliding direction, the movable cover portion pivots around the pivot axis.

10. The power tool according to claim 9, wherein the operation member includes a contact portion configured to contact an obstacle before the movable cover portion and the tip tool contact the obstacle, and when the contact portion is pushed by the obstacle, the movable cover portion moves with respect to the fixed cover portion in a direction exposing the tip tool.

11. The power tool according to claim 9, wherein the movable cover portion is configured to move with respect to the fixed cover portion in a direction exposing the tip tool in response to a user manually operating the operation member.

12. The power tool according to claim 9, wherein the cover further includes a biasing member configured to bias the operation member such that the movable cover portion moves with respect to the fixed cover portion in a direction covering the tip tool.

13. A cover attached to a power tool so as to cover at least a part of a tip tool, the power tool including a motor, a power transmission mechanism connected to the motor, a housing that houses the motor and the power transmission mechanism, and a tip tool holder connected to the power transmission mechanism and holding the tip tool, the cover comprising:

a fixed cover portion fixed to the housing;

a movable cover portion movable with respect to the fixed cover portion; and an operation member mechanically connected to the movable cover portion and configured to move the movable cover portion with respect to the fixed cover portion, wherein the tip tool is rotatable around a rotation axis with respect to the housing, the operation member is movable with respect to the fixed cover portion along a sliding direction substantially orthogonal to the rotation axis, the movable cover portion is pivotable around a pivot axis substantially orthogonal to the rotation axis and the sliding direction with respect to the fixed cover portion, one of the operation member and the movable cover portion includes a cam groove, the other of the operation member and the movable cover portion includes a cam protrusion slidable inside the cam groove, and when the operation member is moved with respect to the fixed cover portion in the sliding direction, the movable cover portion pivots around the pivot axis.

14. The cover according to claim 13, wherein the operation member includes a contact portion configured to contact an obstacle before the movable cover portion and the tip tool contact the obstacle, and when the contact portion is pushed by the obstacle, the movable cover portion moves with respect to the fixed cover portion in a direction exposing the tip tool.

15. The cover according to claim 13, wherein the movable cover portion is configured to move with respect to the fixed cover portion in a direction exposing the tip tool in response to a user manually operating the operation member.

16. The cover according to claim 13, further comprising a biasing member configured to bias the operation member such that the movable cover portion moves with respect to the fixed cover portion in a direction covering the tip tool.

* * * * *